US011586376B2

(12) United States Patent
Meiri et al.

(10) Patent No.: US 11,586,376 B2
(45) Date of Patent: Feb. 21, 2023

(54) N-WAY ACTIVE-ACTIVE STORAGE CONFIGURATION TECHNIQUES

(71) Applicant: EMC IP Holding Company LLC, Hopkinton, MA (US)

(72) Inventors: David Meiri, Somerville, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/368,087

(22) Filed: Jul. 6, 2021

(65) Prior Publication Data
US 2023/0009529 A1    Jan. 12, 2023

(51) Int. Cl.
*G06F 3/06* (2006.01)
*G06F 12/10* (2016.01)

(52) U.S. Cl.
CPC .............. *G06F 3/065* (2013.01); *G06F 3/067* (2013.01); *G06F 3/0619* (2013.01); *G06F 3/0644* (2013.01); *G06F 3/0659* (2013.01); *G06F 12/10* (2013.01); *G06F 2212/65* (2013.01)

(58) Field of Classification Search
CPC ...... G06F 3/065; G06F 3/0619; G06F 3/0644; G06F 3/0659; G06F 3/067; G06F 12/10; G06F 2212/65
See application file for complete search history.

(56) References Cited

U.S. PATENT DOCUMENTS 8,108,580 B1 * 1/2012 Chatterjee ........... G06F 11/2076
711/114
2020/0226145 A1    7/2020 Meiri

OTHER PUBLICATIONS

Vladimir Shveidel, et al, "Balanced Winner Assignment for Deadlock Resolution," U.S. Appl. No. 17/364,937, filed Jul. 1, 2021.

* cited by examiner

*Primary Examiner* — Masud K Khan
(74) *Attorney, Agent, or Firm* — Muirhead and Saturnelli, LLC

(57) ABSTRACT

A stretched volume may be configured from N volumes of N data storage systems configured as a cluster. N may be an integer greater than two. Each of the N volumes may be included in a different one of the N data storage systems. The N volumes may be exposed to a host as a logical volume having a unique identifier over a plurality of paths from the N data storage systems. The N volumes may be configured for multidirectional synchronous replication. At a first system of the cluster, a write operation may be received that writes to a target logical address of the stretched volume. Servicing the first write may include synchronously replicating the first write to every other one of the N data storage systems of the cluster. Also described are techniques for handling lock contention and avoiding deadlock in connection with processing writes to the stretched volume.

19 Claims, 17 Drawing Sheets

N-WAY ACTIVE-ACTIVE STORAGE CONFIGURATION TECHNIQUES

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION:

Various embodiments of the techniques herein may include a method, a system and a computer readable medium comprising: configuring a stretched volume from N volumes of N data storage systems configured as a cluster, wherein N is an integer value that is greater than two, wherein each of the N volumes is included in a different one of the N data storage systems, wherein the N volumes are exposed to a host as a same logical volume having a same first unique identifier over a plurality of paths from the N data storage systems, wherein the N volumes are configured for multi-directional synchronous replication whereby a write directed to the stretched volume received at any one of the N data storage systems is synchronously replicated to every other one of the N data storage systems of the cluster; receiving, at a first of the N data storage systems, a first write that writes first data to a target logical address of the stretched volume; and in response to receiving the first write at the first data storage system, servicing the first write, wherein said servicing the first write includes synchronously replicating the first write received at the first data storage system to every other one of the N data storage systems of the cluster.

In at least one embodiment, the first write may be synchronously replicated directly from the first data storage system to a second data storage system of the N data storage systems over a first link between the first data storage system and the second data storage system.

In at least one embodiment, the first write may be synchronously replicated indirectly from the first data storage system to a third data storage system of the N data storage systems. Processing may include synchronously replicating the first write from the second data storage system to the third data storage system over a second link between the second data storage system and the third data storage system.

In at least one embodiment, servicing the first write may include: acquiring, by the first data storage system, N locks providing the first data storage system with exclusive access to the target logical address of the stretched volume across the cluster, wherein each of the N locks is acquired from a corresponding one of the N data storage systems of the cluster; applying the first write to the first target logical address of the stretched volume, wherein applying the first write includes storing the first data at physical storage locations on the N volumes of the N data storage systems configured as a cluster, wherein the physical storage locations are mapped to the target logical address of the stretched volume; and releasing the N locks. Servicing the first write may include determining, by the first data storage system, that a first of the N locks is currently held by a second data storage system of the cluster in connection with servicing a second write operation directed to the stretched volume.

In at least one embodiment, a hierarchy of the N data storage systems of cluster may denote a ranking of the N data storage systems, and wherein servicing the first write may further include: determining whether the first data storage system is ranked higher than the second data storage system in said ranking; and responsive to determining that the first data storage system ranks higher than the second data storage system in said ranking, performing first processing comprising: waiting for the first lock to be released by the second data storage system; and acquiring, by the first data storage system, the first lock.

In at least one embodiment, servicing the first write may include, responsive to determining that the first data storage system does not rank higher than the second data storage system in said ranking, performing second processing comprising releasing any of the N locks held by the first data storage system in connection with said servicing the first write. The ranking may be randomly determined.

In at least one embodiment, processing may include periodically determining a new ranking of the N data storage systems of the cluster. The new ranking may replace a current ranking of the N data storage systems of the cluster and wherein the new ranking may be used in place of the current ranking when servicing writes directed to a plurality of stretched volumes configured across the N data storage systems of the cluster. The plurality of stretched volumes may include the stretched volume.

In at least one embodiment, a first weight may be associated with the first write being serviced by the first data storage system, and wherein a second weight may be associated with the second data storage system currently holding the first lock. Servicing the first write may include: determining whether the first weight is greater than the second weight; responsive to determining that the first weight is greater than the second weight, performing first processing comprising: waiting for the first lock to be released by the second data storage system; and acquiring, by the first data storage system, the first lock.

In at least one embodiment, servicing the first write may include responsive to determining that the first weight is not greater than the second weight, performing second processing comprising releasing any of the N locks held by the first data storage system in connection with said servicing the first write.

In at least one embodiment, a logical address range of the stretched volume may be partitioned into a plurality of chunks, wherein each of the plurality of chunks may be owned by a single one of the N data storage systems of the cluster, and wherein the target logical address of the first write may be included in a first of the plurality of chunks owned by a particular one of the N data storage systems of the cluster. Servicing the first write may include: determining whether the first data storage system owns the first chunk; and responsive to determining that the first data storage system owns the first chunk, performing first processing comprising: said acquiring the N locks; said applying the first write to the first target logical address of the stretched volume; and said releasing the N locks.

In at least one embodiment, servicing the first write may include: responsive to determining that the first data storage system does not own the first chunk, performing second processing comprising: sending a request to each of the other N data storage systems of the cluster requesting ownership of the first chunk; receiving, from one of the N data storage systems that is a current owner of the first chunk, a response indicating that ownership of the first chunk is transferred from the one data storage system to the first data storage system; and performing said acquiring the N locks. The second processing may include: said applying the first write to the first target logical address of the stretched volume; and said releasing the N locks. The first data storage system may be associated with a first bitmap indicating which of the plurality of chunks are owned by the first data storage system, and wherein the one data storage system ma be associated with a second bitmap indicating which of the plurality of chunks are owned by the one data storage system. Prior to transferring ownership of the first chunk to the first data storage system, the second bitmap may indicate that the first chunk is owned by the one data storage system and the first bitmap may indicate that the first chunk is not owned by the first data storage system. After transferring ownership of the first chunk from the one data storage system to the first data storage system, the second bitmap may be updated to indicate that the first chunk is not owned by the one data storage system and the first bitmap may be updated to indicate that the first chunk is owned by the first data storage system.

In at least one embodiment, responsive to determining that the first data storage system does not own the first chunk, performing second processing comprising: sending a request to each of the other N-1 data storage systems of the cluster requesting ownership of the first chunk; receiving N-1 responses from the other N-1 data storage systems indicating that none of the other N-1 data storage systems is a current owner of the first chunk; responsive to receiving said N-1 responses, claiming ownership of the first chunk by the first data storage system; and acquiring the N locks.

BRIEF DESCRIPTION OF THE DRAWINGS:

Features and advantages of the present invention will become more apparent from the following detailed description of exemplary embodiments thereof taken in conjunction with the accompanying drawings in which.

Figure 1:
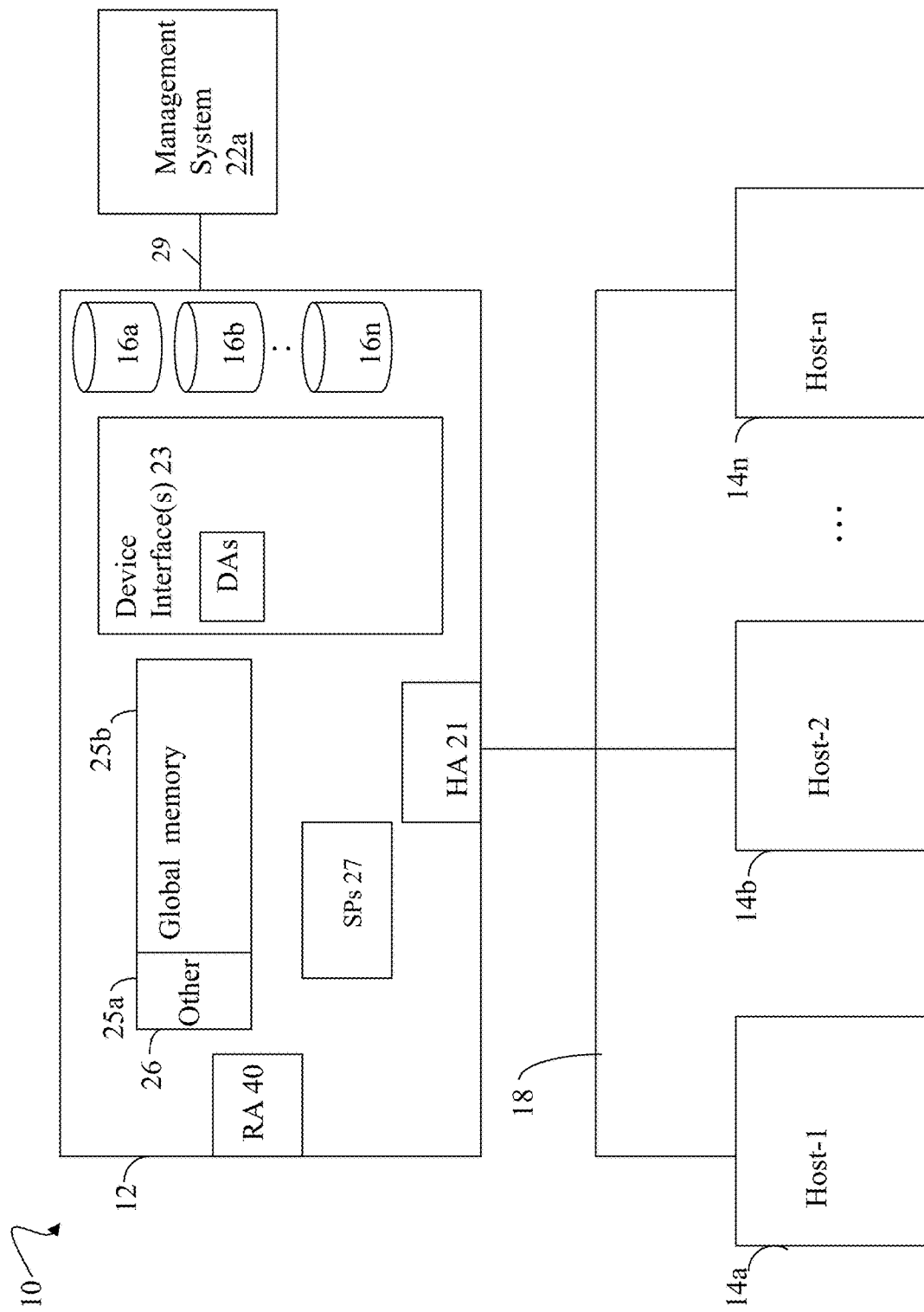
FIG. 1 is an example of components that may be included in a system in accordance with the techniques described herein.

DETAILED DESCRIPTION OF
EMBODIMENT(S):

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
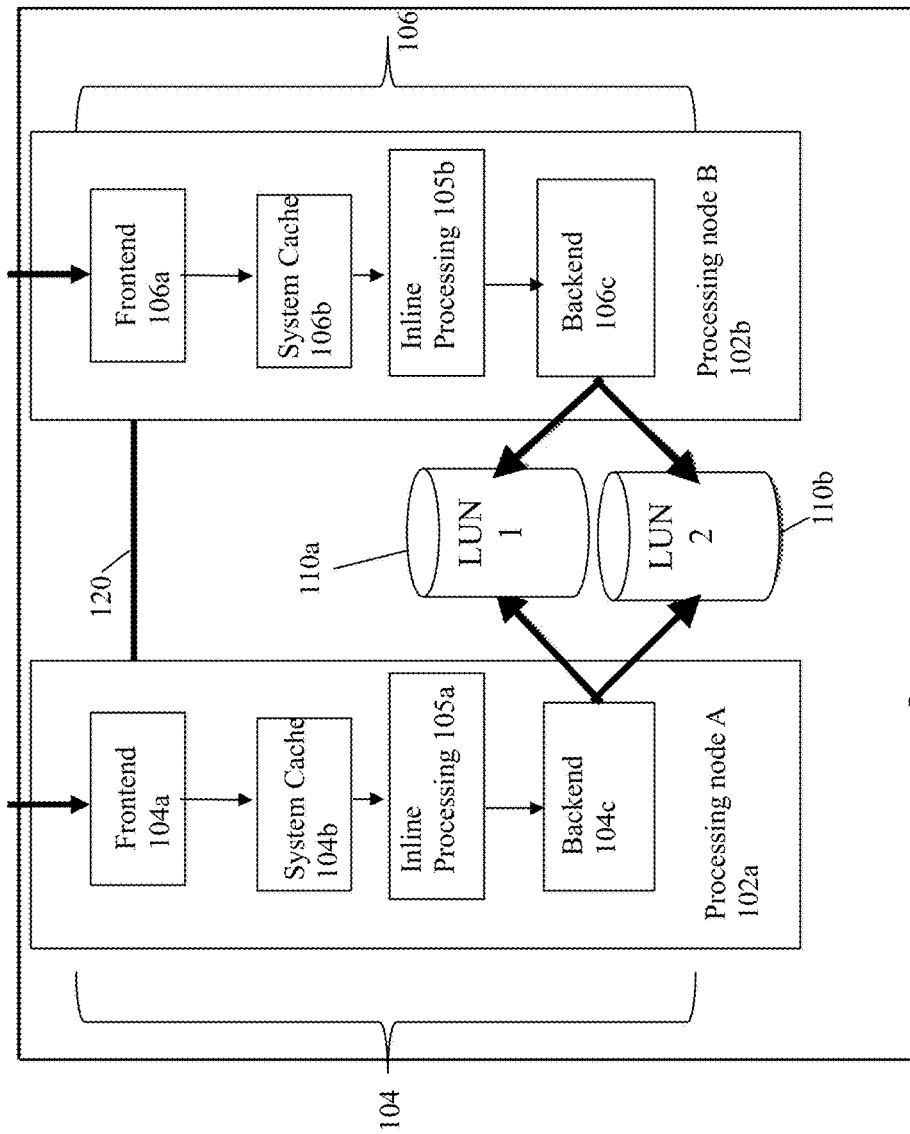
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* may be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 may be used for internode communication between the nodes 102*a*, 102*b*.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105*a*, 105*b* as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102*a*-*b* in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102*a* is the peer node of the node B 102*b*, and the node B 102*b* is the peer node of the node A 102*a*.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Data replication is one of the data services that may be performed on a data storage system in an embodiment in accordance with the techniques herein. In at least one data storage system, remote replication is one technique that may be used in connection with providing for disaster recovery (DR) of an application's data set. The application, such as executing on a host, may write to a production or primary data set of one or more LUNs on a primary data storage system. Remote replication may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system. A remote data replication service or facility may provide for automatically replicating data of the primary data set on a first data storage system to a second remote data storage system in an ongoing manner in accordance with a particular replication mode, such as a synchronous mode described elsewhere herein.

Figure 3:
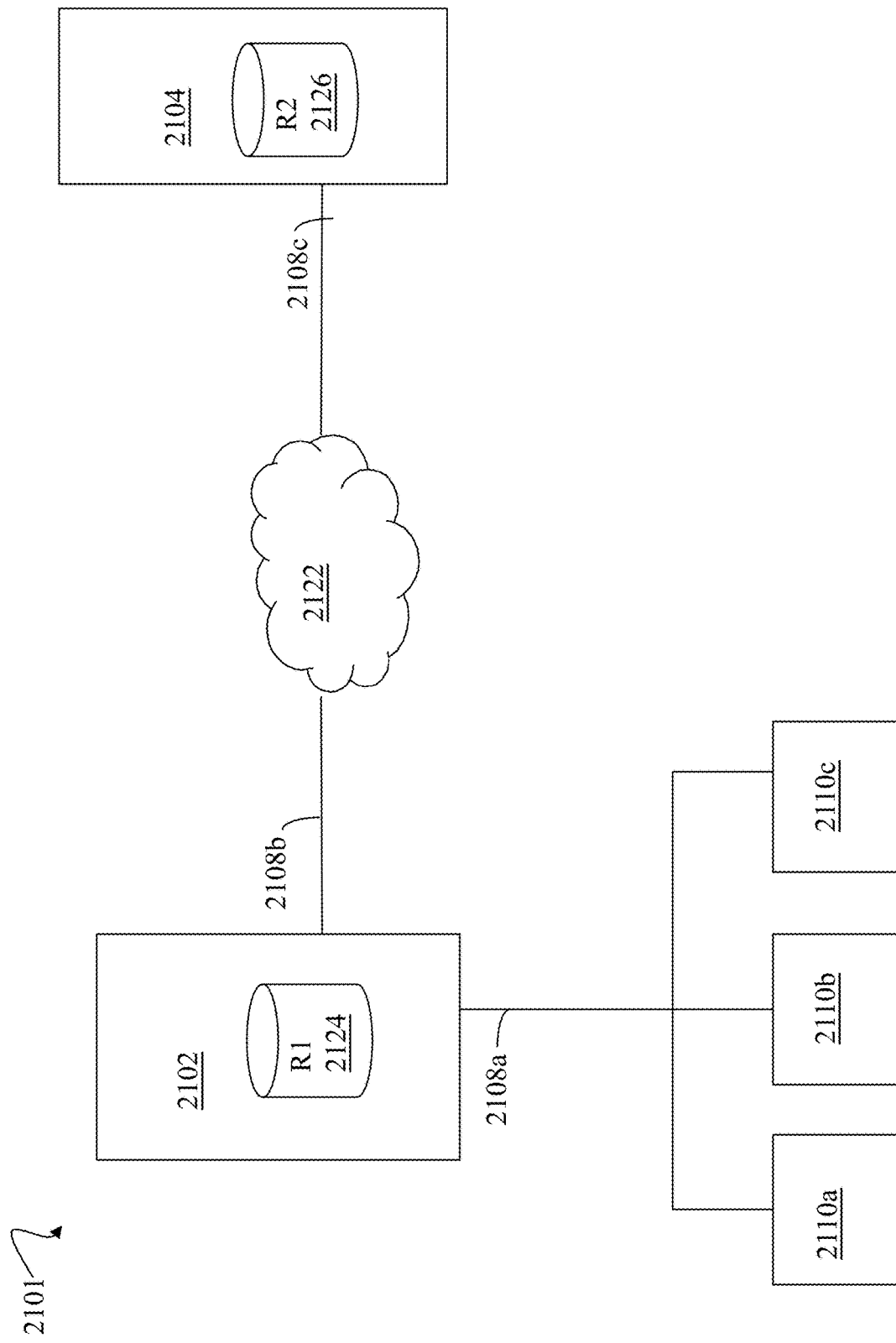
FIG. 3 is an example of systems that may be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection.

The data storage systems 2102 and 2104 may include one or more devices. In this example, the data storage system 2102 includes the storage device R1 2124, and the data storage system 104 includes the storage device R2 2126. Both of the data storage systems 2102, 2104 may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. With remote replication, a user may denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a may read and write data using the R1 volume in 2102, and the RRF may handle the automatic copying and updating of data from R1 to R2 in the data storage system 2104. Communications between the storage systems 2102 and 2104 may be made over connections 2108b, 2108c to the network 2122.

A RRF may be configured to operate in one or more different supported replication modes. For example, such modes may include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The RRF operating in the synchronous mode may propagate the write data across an established connection or link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
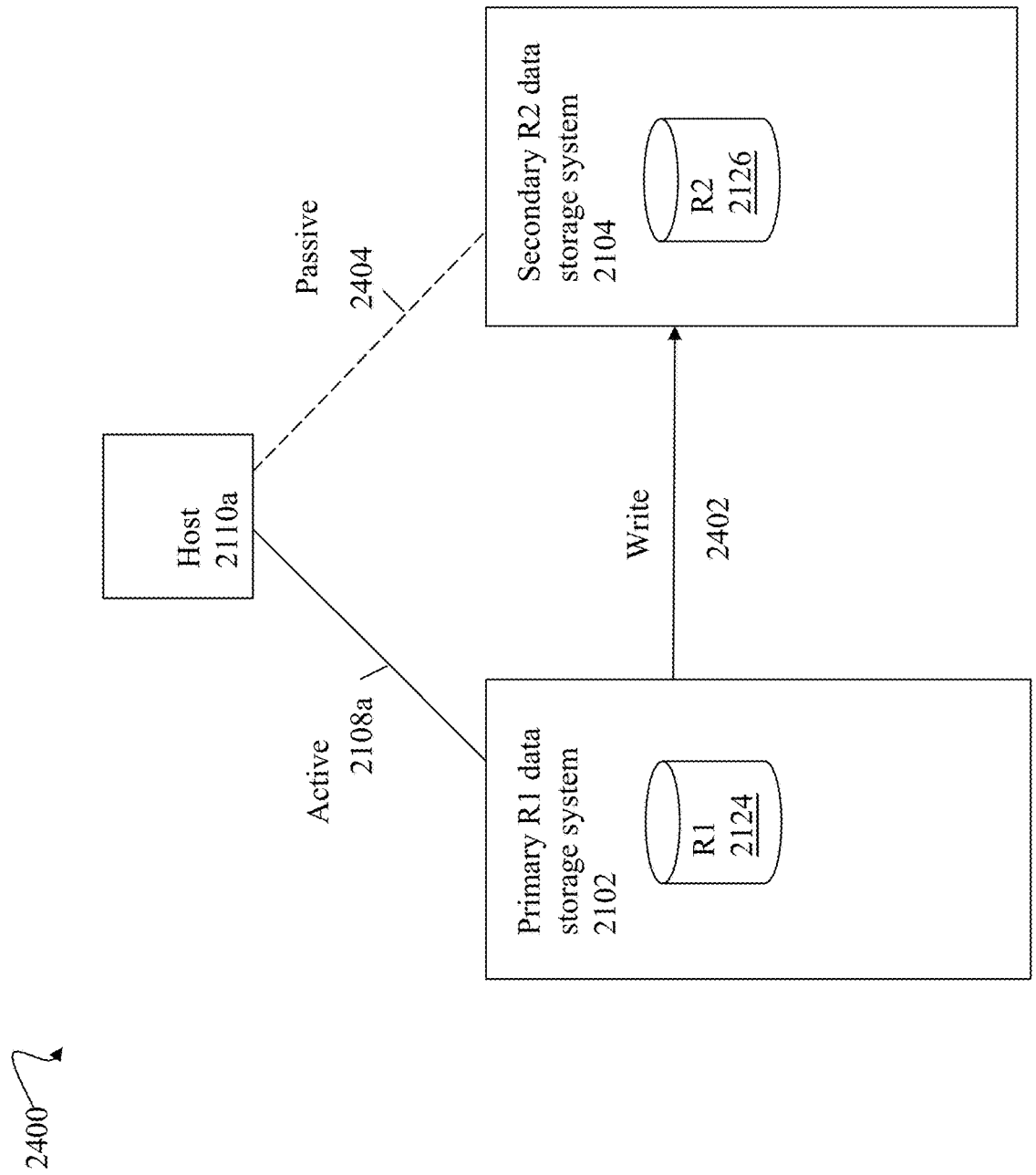
FIG. 4 is an example illustrating an active-passive replication arrangement.

With reference to FIG. 4, shown is a further simplified illustration of components that may be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, may also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110*a* does not issue I/Os directly to the R2 data storage system 2104. The configuration of FIG. 4 may also be referred to herein as an active-passive configuration such as may be used with synchronous replication and other supported replication modes where the host 2110*a* has an active connection or path 2108*a* over which all I/Os are issued to only the R1 data storage system. The host 2110*a* may have a passive connection or path 2404 to the R2 data storage system 2104.

In the configuration of 2400, the R1 device 2124 and R2 device 2126 may be configured and identified as the same LUN, such as LUN A, to the host 2110*a*. Thus, the host 2110*a* may view 2108*a* and 2404 as two paths to the same LUN A, where path 2108*a* is active (over which I/Os may be issued to LUN A) and where path 2404 is passive (over which no I/Os to the LUN A may be issued). For example, the devices 2124 and 2126 may be configured to have the same logical device identifier such as the same world wide name (WWN) or other identifier as well as having other attributes or properties that are the same. Should the connection 2108*a* and/or the R1 data storage system 2102 experience a failure or disaster whereby access to R1 2124 configured as LUN A is unavailable, processing may be performed on the host 2110*a* to modify the state of path 2404 to active and commence issuing I/Os to the R2 device configured as LUN A. In this manner, the R2 device 2126 configured as LUN A may be used as a backup accessible to the host 2110*a* for servicing I/Os upon failure of the R1 device 2124 configured as LUN A.

The pair of devices or volumes including the R1 device 2124 and the R2 device 2126 may be configured as the same single volume or LUN, such as LUN A. In connection with discussion herein, the LUN A configured and exposed to the host may also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110*a*, the same LUN A is exposed over the two paths 2108*a* and 2404.

It should be noted although only a single replication link 2402 is illustrated, more generally any number of replication links may be used in connection with replicating data from systems 2102 to system 2104.

Figure 5:
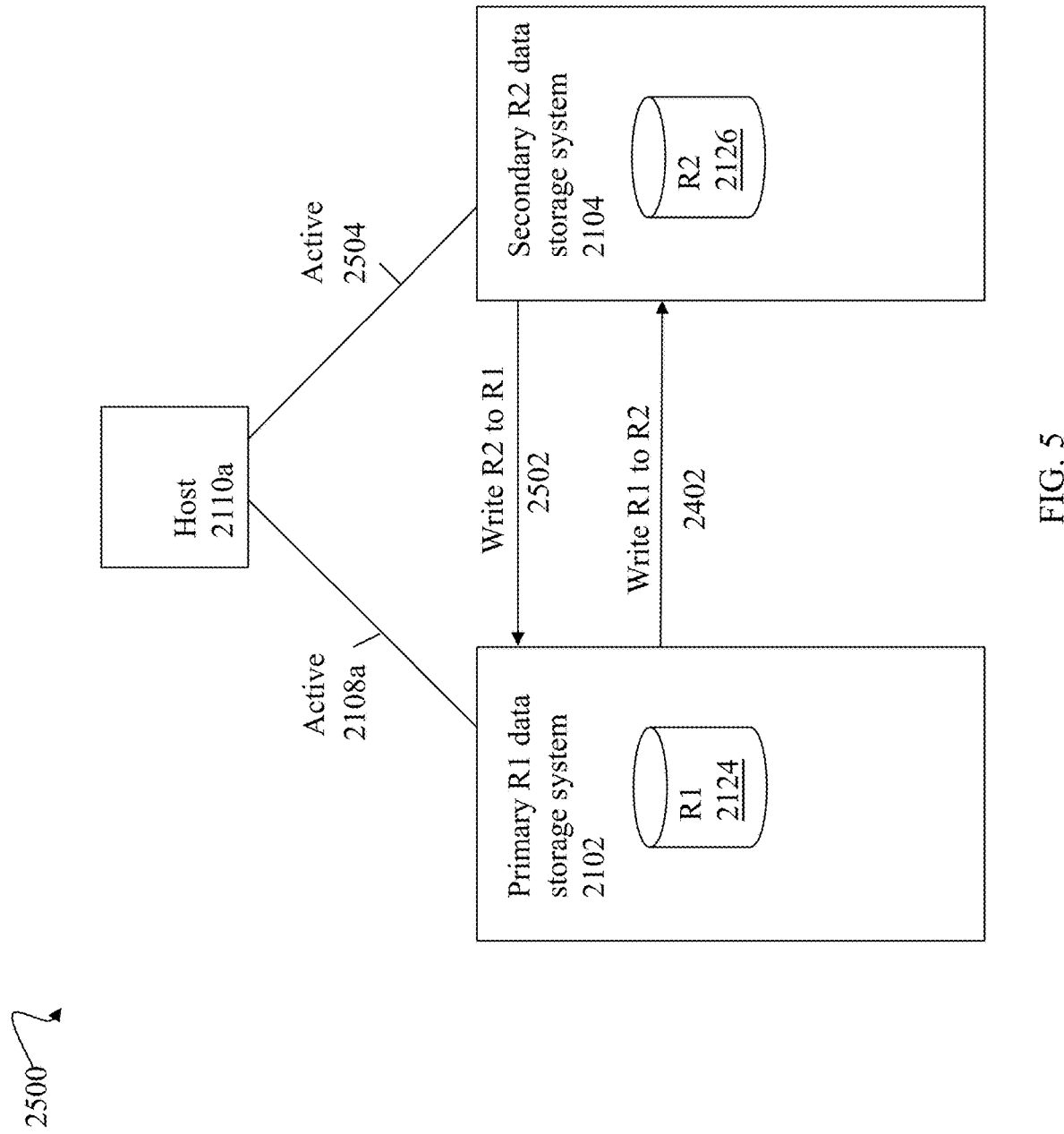
FIG. 5 is an example illustrating an active-active arrangement with a stretched volume.

Referring to FIG. 5, shown is an example configuration of components that may be used in an embodiment. The example 2500 illustrates an active-active configuration as may be used in connection with synchronous replication in at least one embodiment. In the active-active configuration with synchronous replication, the host 2110*a* may have a first active path 2108*a* to the R1 data storage system and R1 device 2124 configured as LUN A. Additionally, the host 2110*a* may have a second active path 2504 to the R2 data storage system and the R2 device 2126 configured as the same LUN A. From the view of the host 2110*a*, the paths 2108*a* and 2504 appear as 2 paths to the same LUN A as described in connection with FIG. 4 with the difference that the host in the example 2500 configuration may issue I/Os, both reads and/or writes, over both of the paths 2108*a* and 2504 at the same time. The host 2110*a* may send a first write over the path 2108*a* which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110*a* over the path 2108*a*, where the acknowledgement indicates to the host that the first write has completed.

The host 2110*a* may also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110*a* over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110*a*, the same stretched LUN A is exposed over the two active paths 2504 and 2108*a*.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108*a* to the system 2102 is stored on the R1 device 2124 and also transmitted to the system 2104 over 2402. The write sent over 2402 to system 2104 is stored on the R2 device 2126. Such replication is performed synchronously in that the received host write sent over 2108*a* to the data storage system 2102 is not acknowledged as successfully completed to the host 2110*a* unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts may access one or both of the R1 device 2124 and the R2 device 2126.

Although only a single link 2402 is illustrated in connection with replicating data from systems 2102 to system 2104, more generally any number of links may be used. Although only a single link 2502 is illustrated in connection with replicating data from systems 2104 to system 2102, more generally any number of links may be used. Furthermore, although 2 links 2402 and 2502 are illustrated, in at least one embodiment, a single link may be used in connection with sending data from system 2102 to 2104, and also from 2104 to 2102.

FIG. 5 illustrates an active-active remote replication configuration for the stretched LUN A. The stretched LUN A is exposed to the host by having each volume or device of the device pair (R1 device 2124, R2 device 2126) configured and presented to the host as the same volume or LUN A. Additionally, the stretched LUN A is configured for two way synchronous remote replication between the two devices or volumes of the device pair.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states (also sometimes referred to herein as ALUA states or path states) may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

Figure 6:
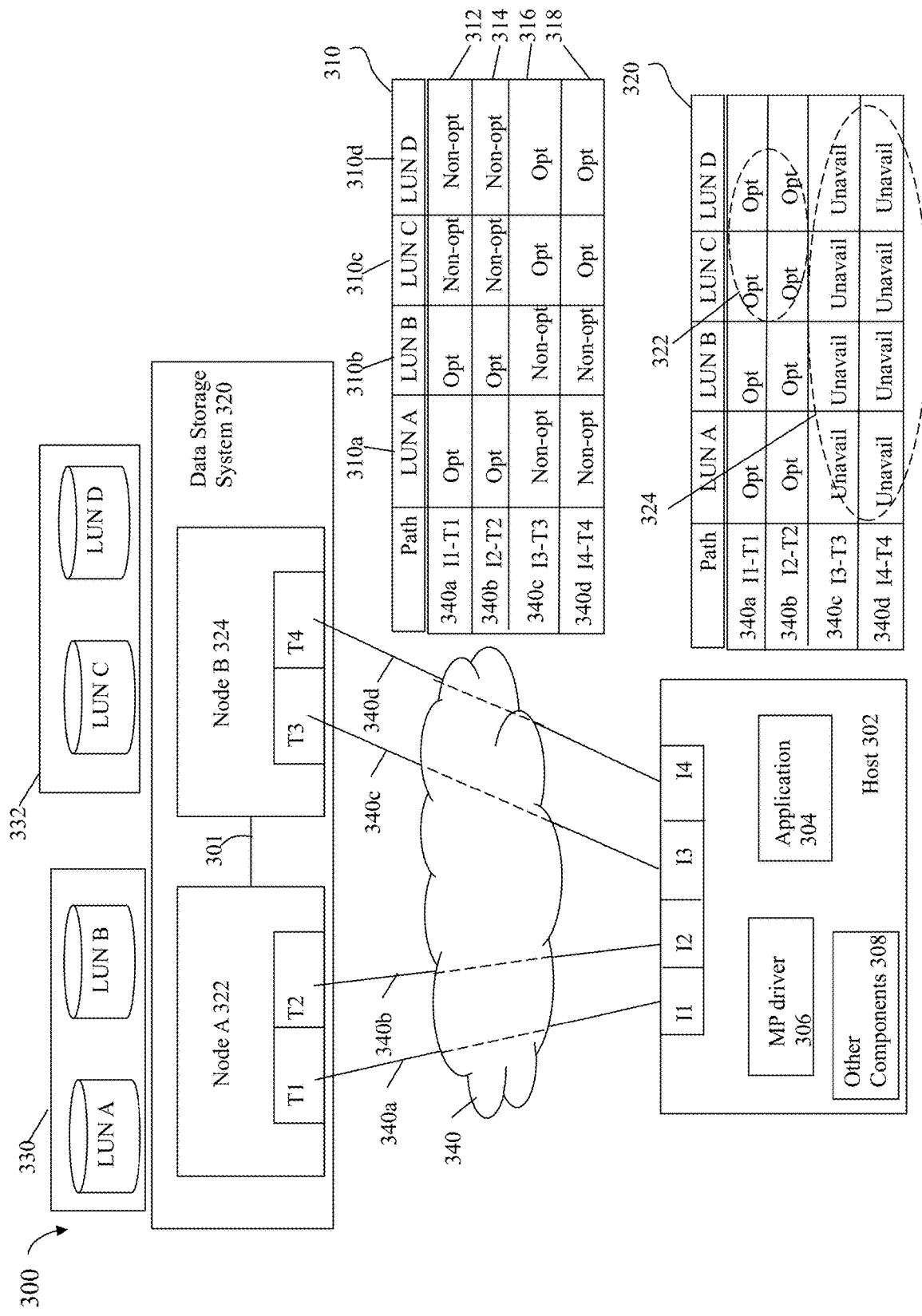
FIG. 6 is an example illustrating path states for paths between a host and a data storage system.

Referring to FIG. 6, shown is an example of an embodiment of a system that may be utilized in connection with the techniques herein. The example 300 includes a host 302, a network 340 and a data storage system 320. The host 302 and the data storage system 320 may communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The host 302 may also include other components 308 such as one or more other layers of software used in connection with communicating the I/O operation from the host to the data storage system 120. For example, element 108 may include Fibre Channel (FC), SCSI and NVMe (Non-Volatile Memory Express) drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In at least one embodiment in accordance with the SCSI standard, each of the initiators and target ports in FIG. 6 as well as other figures herein may be unique WWNs.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 106 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340a-d. As described in more detail below, each of the paths 340a-d may have an associated ALUA state also used by the host when issuing I/O operations. Each path 340a-d may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) directed to the LUNs 330, 332 of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states. Although discussion herein may refer to the data storage system setting and modifying the path access states of the paths between the host and the data storage system, in some embodiments, a host may also set and/or modify the path access states which are then communicated to the data storage system.

In accordance with the techniques herein, the data storage system may set the path state for a particular LUN to preferred or non-preferred for any suitable purpose. In at least one embodiment, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which the host may issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states may be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments may have different path state changes than as denoted by the table 320.

A metro cluster configuration may be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the same single stretched volume, device or LUN.

In a metro cluster configuration, each of the two data storage systems may be in different data centers or may be in two server rooms or different physical locations within the same data center. The metro cluster configuration may be used in a variety of different use cases such as, for example, increased availability and disaster avoidance and DR, resource balancing across data centers and data storage systems, and storage migration.

In a metro cluster configuration, hosts may be configured with uniform host connectivity as illustrated in FIGS. 4 and 5, where a host may be connected to both data storage systems exposing the pair of devices or volumes configured as the same stretched volume or LUN, such as the LUN A described in connection with FIG. 5. From the perspective of the host 2110a of FIG. 5, the data storage system 2102 may be a local data storage system included in the same data center as the host 2110a, and the data storage system 2104 may be a remote data storage system. Thus the host 2110a is configured with uniform host connectivity. In contrast to uniform host connectivity is non-uniform host connectivity, where the host is only connected to the local data storage system but not the remote data storage system of the metro cluster configuration.

Figure 7A:
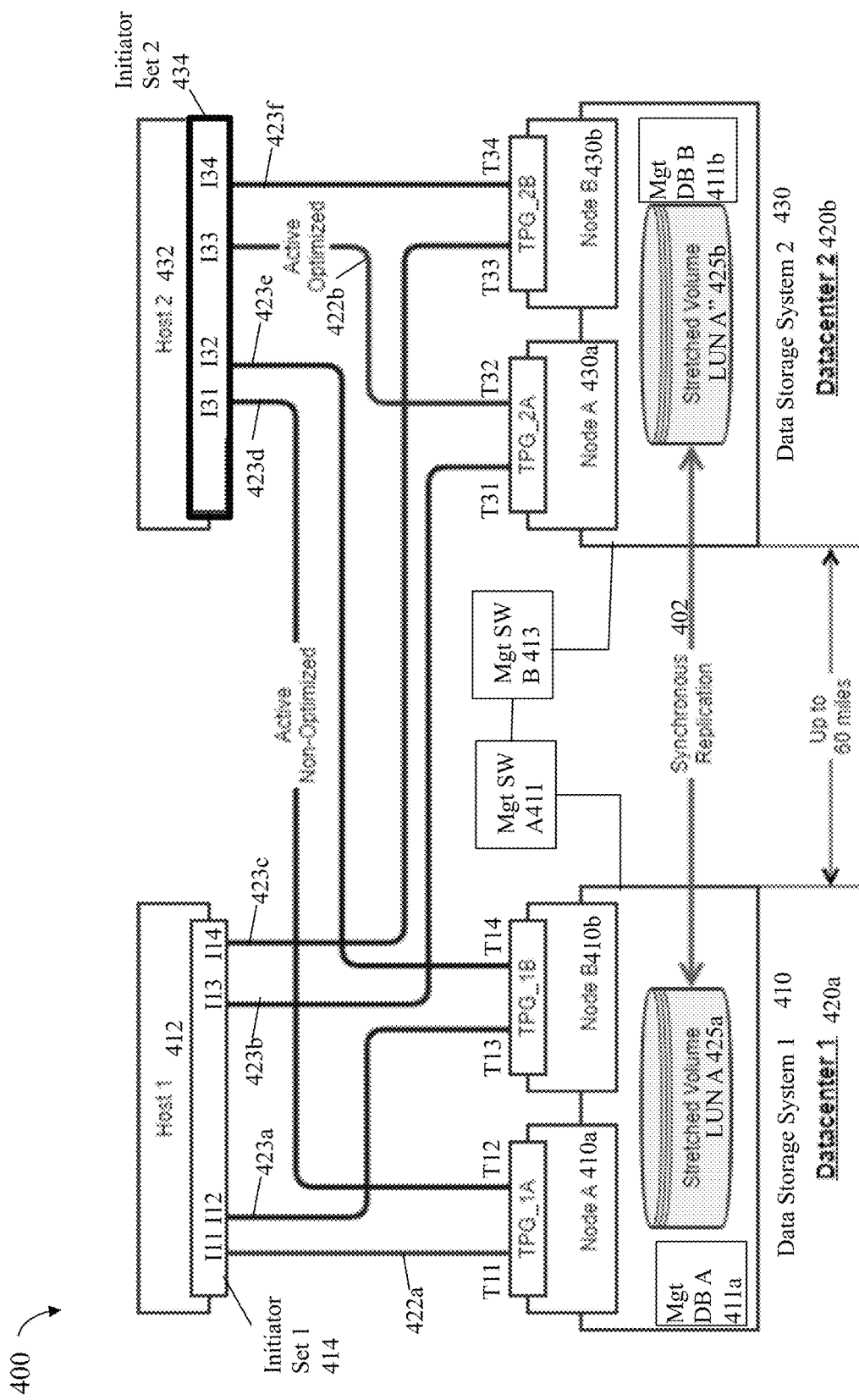
FIGS. 7A and 7B are examples illustrating path states for paths between multiple data storage systems and multiple hosts in a metro cluster configuration with a stretched volume.

Referring to FIG. 7A, shown is a more detailed illustration of a metro cluster configuration. The example 400 includes a stretched volume or LUN A and two hosts configured 412, 414 with uniform host connectivity in at least one embodiment.

In the FIG. 7A, the host 1 412 and the data storage system 1 410 are in the data center 1 420a. The host 2 414 and the data storage system 2 430 are in the data center 2 420b. The host 1 412 includes the initiators I11-I14. The host 432 includes the initiators I31-I34. The data storage systems 410, 430 may be dual node data storage systems such as described elsewhere herein (e.g., FIG. 2). The data storage system 410 includes the node A 410a with the target ports T11-T12, and the node B 410b with the target ports T13-T14. The data storage system 430 includes the node A 430a with the target ports T31-T32, and the node B 430b with the target ports T33-T34. From the perspective of host 1 412, the data storage system 1 410 and data center 1 420a may be characterized as local, and the data storage system 2 430 and the data center 2 420b may be characterized as remote. From the perspective of host 2 432, the data storage system 1 410 and data center 1 420a may be characterized as remote, and the data storage system 2 430 and the data center 2 420b may be characterized as local.

As illustrated in the FIG. 7A, the stretched volume or LUN A is configured from the device or volume pair LUN A 425a and LUN A" 425b, where both the LUNs or volumes 425a-b are configured to have the same identity from the perspective of the hosts 412, 432. The LUN A 425a and the LUN A" 425b are configured for two way synchronous remote replication 402 which, consistent with other description herein, provides for automated synchronous replication of writes of the LUN A 425a to the LUN A" 425b, and also automated synchronous replication of writes of the LUN A" 425b to the LUN A 425a. The LUN A 425a may be exposed to the hosts 412, 432 over the target ports T11-T14 of the system 410, and the LUN A" 425b may be exposed to the hosts 412, 432 over the target ports T31-T34.

In at least one embodiment in which the arrangement of FIG. 7A is in accordance with the ALUA protocol, the paths 423a-f may be configured with the path state of active non-optimized and the paths 422a-b may be configured with the path state of active optimized. Thus, the host 412 has uniform host connectivity to the stretched volume or LUN A by the active connections or paths 422a (I11-T11), 423a (I12-T13) to the data storage system 410 exposing the LUN A 425a, and the active connections or paths 423b (I13-T31), 423c (I14-T33) to the data storage system 430 exposing the LUN A" 425b. The host 432 has uniform host connectivity to the stretched volume or LUN A by the active connections or paths 423d (I31-T12), 423e (I32-T14) to the data storage system 410 exposing the LUN A 425a, and the active connections or paths 422b (I33-T32), 423f (I34-T34) to the data storage system 430 exposing the LUN A" 425b.

Uniform host connectivity deployments such as illustrated in FIG. 7A offer high resiliency to failure of any local component or cross data center connection. Failures such as a total loss of a local storage system (that is local from a host's perspective) result in the host performing I/Os using the cross-datacenter links to the remote data storage system, which results in increased latency but does not require immediate application restart since I/Os issued from the host are still serviced using the remote data storage system. FIG. 7A illustrates a configuration that may also be referred to as a metro cluster configuration with a pair of data storage systems 410, 430. With respect to a host, such as the host 412, one of the data storage systems, such as the system 410, may be local and in the same data center as the host, and the other remaining data storage system, such as the system 430, may be remote and in a different location or data center than the host 412.

With reference to FIG. 7A, the element 411 denotes the data storage system management software application A for the system 410, and the element 413 denotes the data storage system management application B for the system 430. The management applications 411 and 413 may communicate with one another through a network or other suitable communication connection when performing the processing needed for the techniques described herein. The element 411a represents the management database (DB) A that stores management and other information used by the management application A 411 for the system 410. The element 413a represents the management DB B that stores management and other information used by the management application B 413 for the system 430.

To further illustrate, the FIG. 7A may denote the path states at a first point in time T1. At a second point in time T2 subsequent to T1 and illustrated in the FIG. 7B, the data storage system 2 430 may experience a failure or disaster where the LUN A" 425b on data storage on the system 430 is unavailable and cannot be accessed through the target ports T31-34. In response to the unavailability of the data storage system 430, the host 2 432 uses the path 454b to issue I/Os to the LUN A 425a on the data storage system 410. Thus, failure of the system 430 that is local to the host 432 results in the host 432 performing I/Os using the cross-data center link 454b to the remote system 410 which results in increased latency but does not require immediate application restart since I/Os issued by the application 3 (app 3) on the host 432 may still be serviced using the remote system 410.

In response to the unavailability of the data storage system 430, the paths 452a-d to the system 430 transition to the unavailable path state, the path 454a remains active optimized, the path 454b transitions from active non-optimized to active optimized, and the remaining paths 456a-b remain active non-optimized.

FIG. 7A illustrates connectivity between the hosts 412, 432 and the data storage systems 410, 430 under normal operating conditions where both systems 410, 430 and both volumes or LUNs 425a, 425b are available to the hosts 412, 432 for servicing I/Os. In such normal operating conditions, the ALUA path states may be as described in connection with FIG. 7A where each of the hosts 412, 432 issues I/Os to the particular one of the systems 410, 430 that is local or in the same data center as the particular host. In such normal operating conditions as illustrated in FIG. 7A, at least one "local path" between the host and the local data storage system is active optimized, and remote paths between the host and the remote data storage system are active non-optimized. One or more of the remote paths with respect to a particular host may be used in the event the local data storage system and/or local paths to the local data storage system are unavailable such as described in connection with FIG. 7B with respect to the host 412.

Thus, in the absence of a data storage system failure and under normal operating conditions such as illustrated in FIG. 7A, the host 412 issues I/Os to its local data storage system 410 where the host 412 and the system 410 are located in the same data center 420a; and the host 432 issues I/Os to its local data storage system 430 where the host 432 and the system 430 are located in the same data center 420b.

Generally, there are several ways to accomplish having each host under normal conditions issue I/Os to a local data storage system in the same data center as the host.

In some implementations, a native host multi-path driver or a third party multi-path drive may be able to differentiate the particular paths to the local data storage system and the particular paths to the remote data storage system based on path latency. Generally the paths experiencing the largest latencies when sending an I/O may be determined as those to the remote data system, and those with the smallest latencies may be determined as those to the local data storage system. In such implementations, the host utilizes its multi-path driver to select a particular path to a local data storage system over which to send I/Os.

Figure 7B:
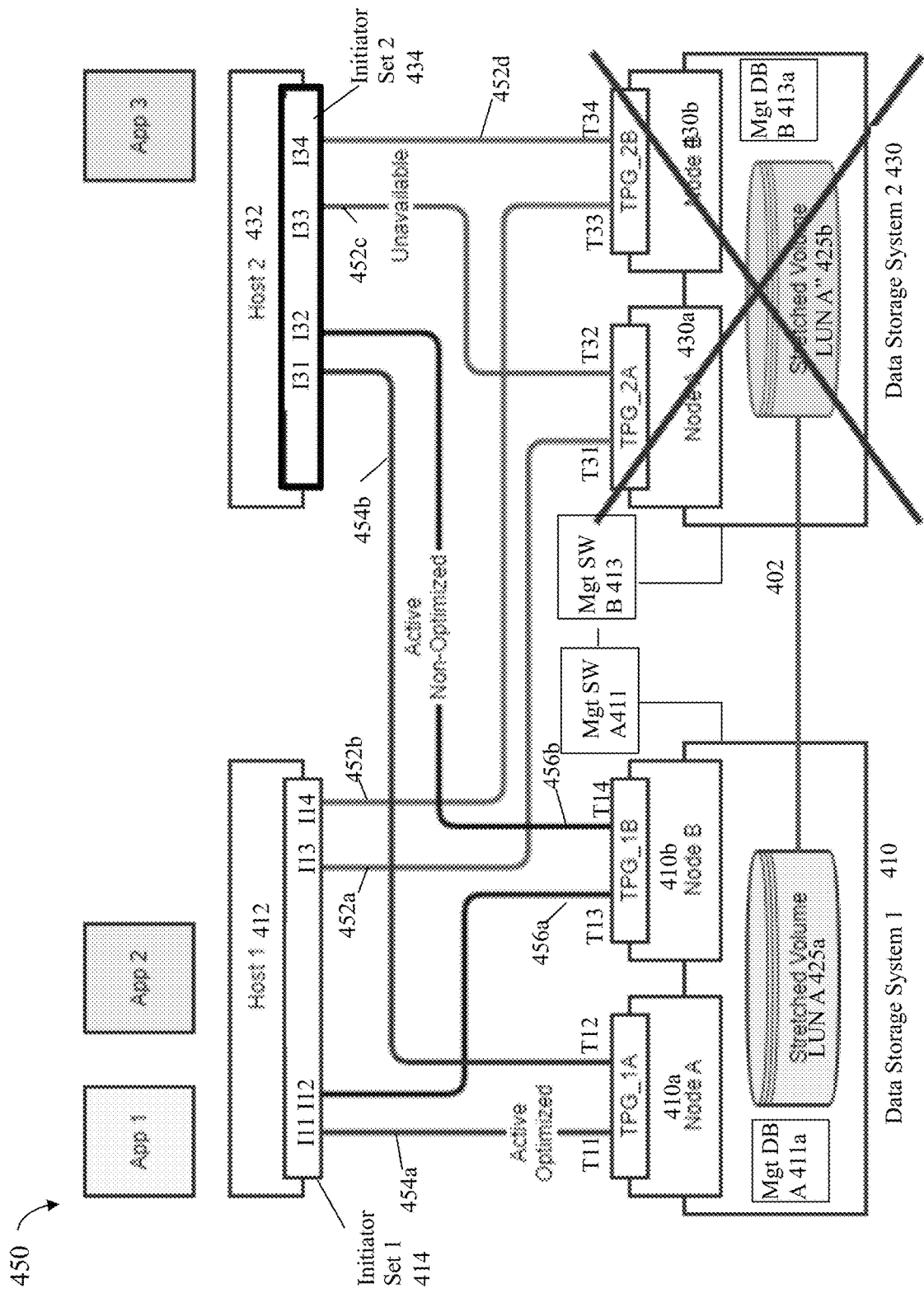

In at least one embodiment, processing may be performed consistent with discussion elsewhere herein where the data storage systems determine the ALUA path states, such as in connection with FIGS. 6, 7A and 7B, and expose or communicate such ALUA path states (also sometimes referred to herein access states) to the hosts. Thus, when the LUN is exposed to a host initiator over multiple paths (e.g., where the same LUN is accessible through multiple different target ports of the data storage system), the data storage systems may vary the associated access state of each such path in order to vary and control the particular ones of the multiple paths over which the host may issue I/Os to the LUN. In particular, processing may be performed by the data storage systems, such as the systems 410, 430 of FIGS. 7A and 7B, to determine which particular paths to the hosts 412, 432 are active optimized and which are active non-optimized at various points in time. The processing may include the data storage systems 410, 430 communicating the path states to the hosts 412, 432 and then also notifying the hosts 412, 432 when there are any changes to the path states, such as in response to a data storage system failure such as illustrated in FIG. 7B. In this manner, the hosts 412, 432 may select paths over which to send I/Os based on the particular ALUA path states or access states for particular volumes or LUNs as determined and communicated by the data storage systems 410, 430, where I/Os are sent by the hosts over those active-optimized paths.

Consistent with discussion herein such as in connection with FIGS. 5, 7A and 7B, a stretched volume or LUN is configured from a LUN or volume pair (R1, R2), where R1 and R2 are different instances of LUNs or volumes respectively on two data storage systems of the metro cluster. Further, the volumes R1 and R2 are configured to have the same identity and appear to a host as the same volume or LUN. Thus a volume or LUN on a first local data storage system may be characterized as stretched if that volume or LUN also has a matching counterpart remote volume or LUN on the other remote data storage system of the metro cluster pair.

In contrast to the stretched volume or LUN is an unstretched or non-stretched volume or LUN. A volume or LUN may be characterized as an unstretched volume or LUN existing on only one data storage system within the metro cluster pair.

An operation referred to herein as stretching a LUN or volume may be applied to an unstretched LUN or volume whereby a local unstretched volume or LUN on only one of the data storage systems of the metro cluster pair is converted to a stretched LUN or volume. Converting the unstretched volume or LUN of a first local data storage system of the metro cluster pair to a stretched volume may include creating a counterpart remote LUN on the second remote data storage system of the metro configuration. Consistent with other discussion herein regarding a stretched volume or LUN, from the external host perspective, the counterpart remote LUN is configured to have the same identity as the non-stretched LUN on the first data storage system. In connection with stretching an existing local unstretched LUN having the normal attribute, the local LUN has its attribute modified to stretched to denote a stretched volume.

In connection with stretching a LUN or creating a stretched LUN, such as creating the stretched LUN A or stretching the LUN A 425a resulting in the stretched LUN or volume configuration with the volumes 425a and 425b as illustrated in the FIG. 7A, ALUA path state changes may be made so that the host 1 412 local to the storage system 410 has one or more active optimized paths to the local stretched LUN copy 425a on the system 410 and one or more active non-optimized paths to the remote stretched LUN copy 425b on the system 430. Additionally, ALUA path state changes may be made so that the host 2 432 local to the storage system 430 has one or more active optimized paths to the local stretched LUN copy 425b on the system 430 and one or more active non-optimized paths to the remote stretched LUN copy 425a on the system 410. In some contexts as discussed herein, a LUN or volume and data storage system may be characterized as local with respect to a host if the host, LUN and data storage system are located in the same data center. Also in some contexts as discussed herein, a volume or LUN may be characterized as having local target ports and local TPGs over which the LUN is exposed to a host. In this case, such local ports and local TPGs may be characterized as local with respect to the LUN in that the LUN, local ports and local TPGs are all included in the same data storage system.

An unstretched volume or LUN of a data storage system included in a data center may be exposed to a host that is local to the data storage system whereby the host and the data storage system are included in the same data center. In this case in an embodiment in accordance with the ALUA standard, the unstretched volume is exposed to the host over at least one path from the data storage system to the host where the at least one path is active optimized. It should be noted that in some instances, under failure conditions, all active optimized paths may be off-line or unavailable whereby only active non-optimized paths remain as available. In this case, the active non-optimized path(s) may be used by the host.

Consistent with other discussion herein, depending on the data storage system implementation, only a single ALUA path within a local data center with respect to a host for a stretched volume may be active optimized such as illustrated in FIG. 7A. In contrast to the foregoing, alternatively, more than a single ALUA path within a local data center for a particular host may be active optimized for the stretched volume. However, in such embodiments consistent with other discussion herein, paths from a host to a remote data storage system and a remote data center for a remote copy of the stretched volume may be active non-optimized in order to make the host prefer to use local paths to the local copy of the stretched volume. It should be noted that while particular figures such as FIG. 7A may show just a single active optimized path for simplicity, in most real-life deployments, paths may between the host and a data storage system may have an associated access path state at the group level, such as based on a group of target ports as discussed elsewhere herein.

In connection with the data storage systems, or more particularly, the control path and management software of the data storage systems setting and modifying ALUA path states for exposed volumes or LUNs, the control path and management software of such systems may be configured with, and are aware of, the current topology of the metro cluster configuration. For example, the management software such as denoted by the elements 411 and 413 of FIGS. 7A and 7B know which hosts and data storage systems are local and included in the same data center, and which hosts and data storage systems are remote and included in different data centers. In this manner, the management software components 411, 413 respectively of the systems 410, 430 may communicate and cooperate to appropriately set ALUA path states and also ensure that both of the systems 410, 430 report the same information to the hosts 412, 432 for the exposed volumes or LUNs, such as the stretched LUN A configured from the volume pair 425a, 425b.

In at least one embodiment of a metro cluster configuration including two data storage systems such as described elsewhere herein, for example, such as in FIGS. 5 and 7A, different techniques may be used to maintain and manage the metro cluster configuration. For example, in at least one embodiment, a Time to Live (TTL) mechanism may be used to maintain and manage the metro cluster configuration and relationship between the two data storage systems. Using the TTL mechanism, one data storage system may be designated as the leader or master system and the other peer system may be designated as the follower or slave system. Using the TTL mechanism, the leader system may provide a TTL grant to the follower system granting or providing the follower system with a license or membership in the metro cluster configuration. Additionally, the TTL grant may be used to provide an amount of time for the license or cluster membership to the follower system after which the license or cluster membership may be deemed expired. Using the TTL mechanism, the leader can also effectively revoke the TTL grant to the follower even in the presence of link failures or other communication issues that prevent the leader from communicating with the follower. For example, the leader may effectively revoke the TTL grant to the follower by allowing the TTL grant to expire. The TTL mechanism used in connection with two data storage systems to maintain and manage a metro cluster configuration is described in more detail, for example, in U.S. patent application Ser. No. 16/246,984, filed Jan. 14, 2019, now U.S. Patent Publication No. 2020/0226145 A1, published Jul. 16, 2020, entitled "Storage Systems Configured with Time-to-Live Clustering for Replication in Active-Active Configurations, Meiri, which is incorporated by reference herein. Using the TTL mechanism, the follower system may have membership in the metro cluster and perform synchronous replication and other actions as an active member of the metro cluster when the follower system has an unexpired TTL grant.

A stretched volume may be stretched between and among two data storage systems included in a metro cluster configuration as described elsewhere herein, for example, such as in FIGS. 5 and 7A.

More generally and as discussed in more detail below in accordance with embodiments of the techniques herein, a volume or LUN may be stretched between and among more than two data storage systems included in a metro cluster configuration. For example, with reference to FIG. 7C, the stretched volume A is configured from a first volume R1 LUN A 425a on the system 410 and a second volume R2 LUN A" 425b on the system 430, where the volumes 425a-b are configured to have the same identity, "LUN A", as presented to one or more hosts such as the host 481. As discussed above such as in connection with FIG. 7A, the volumes 425a-b may be configured for two way synchronous remote replication in order to synchronize the content of the volumes 425a-b to be mirrors of one another.

For some data storage customers, it may be beneficial to maintain active instances of critical or important data on more than two data storage systems. Examples of such critical or important data may include: database change logs; skeleton data, such as metadata for an application; structural data for a file system or geographically spread content (e.g., even if the same content is not available in all sites at the same time, the structural data describing what content portions are available on which of the multiple sites may be deemed critical and thus stored on more than two data storage systems); and for a server farm, maintaining synchronous information regarding a client's session state on multiple servers so that the client can work on such multiple servers of the server farm within a single active client session.

Figure 7C:
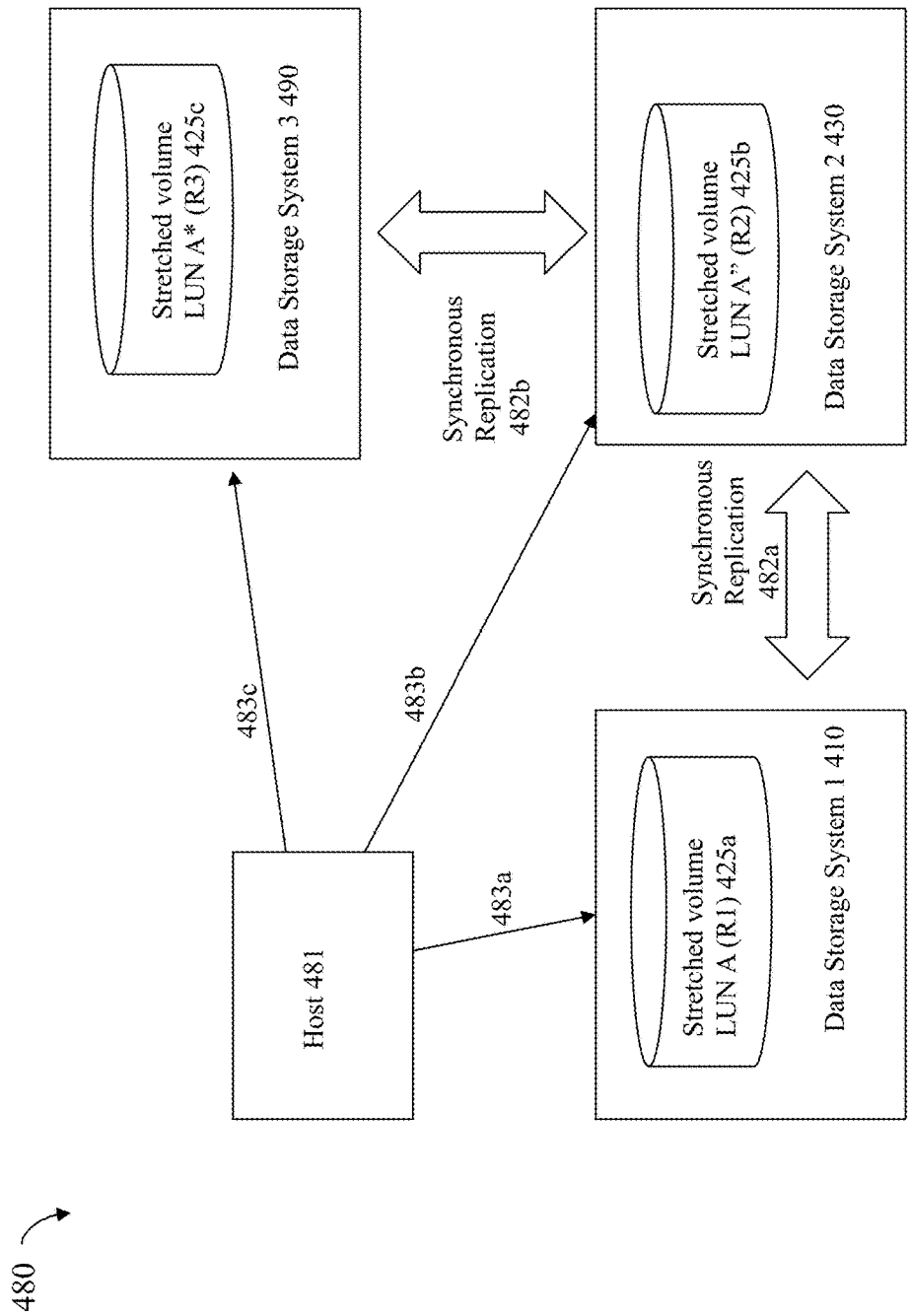
FIGS. 7C, 7D, and 7E and 8 are examples of metro cluster configurations including more than two data storage systems.

With reference to the embodiment of FIG. 7C as noted above, the foregoing concept of a stretched volume or LUN and a metro cluster configuration may be extended to include a third data storage system, the data storage system 3 (DS3) 490, that may also be included in the same metro cluster configuration, whereby a third volume R3, LUN A* 425c on the DS3 490 is also configured to have the same identity as the volumes 425a-b. In this manner, paths from the one or more hosts to the third volume R3 425c on the DS3 490 are similarly viewed as additional paths to the same stretched volume or LUN. In such an embodiment, the volumes 425b-c may be configured to have two way or bidirectional synchronous replication (482b) of writes in a manner similar to the two way or bidirectional synchronous replication (482a) of the volumes 425a-b. In at least one embodiment, processing may be performed to maintain mirrored identical content on the volumes 425a-c in a synchronous manner whereby writes applied to any one of the volumes 425a-c may also be applied in a synchronous manner to the remaining ones of the volumes 425a-c. For example, a write may be received from the host 481 at the system 410 for the stretched volume copy 425a. The write to the volume 425a may be synchronously replicated to the system 430 and applied to the volume 425b, and also synchronously replicated from the system 430 to the system 490 and applied to the volume 425c.

In at least one embodiment, an acknowledgement may not be returned to the host that sent the originating write to the system 410 until the system 410 receives an acknowledgement, directly or indirectly, that both the systems 430 and 490 have completed the write such as by storing the write data in caches of the systems 430, 490. The example 480 illustrates a daisy-chain like arrangement for the stretched volume configured from the volumes 425a-c with the same identity. In such an arrangement for synchronous replication, a write from a host may be received at the system 410. In response, the write may be written locally to the system 410 (e.g., into a cache of the system 410), and then synchronously replicated from the system 410 to the system 430. The system 430 receiving the write may store the write locally in the system 430 (e.g., in the cache of the system 430) and then synchronously replicate the write from the system 430 to the system 490. In response to receiving the write, the system 490 may locally store the write (e.g., in the cache of the system 490) and then return a first acknowledgement to the system 430. In response to receiving the first acknowledgement, the system 430 may return a second acknowledgement to the system 410. In response to receiving the second acknowledgement, the system 410 may then return a third acknowledgement to the host regarding completion of the write operation. Receiving this second acknowledgement notifies the system 410 that the write has been successfully replicated and stored in the systems 430 and 490. Other arrangements and configurations of stretched volumes across more than 2 data storage systems are also possible. In such other arrangements and configurations, the original data storage system 410 receiving the host write may only return an acknowledgment to the host regarding completion of the received write once the system 410 receives an acknowledgment, directly or indirectly, that all systems configured in the stretched LUN or volume configuration, have received and stored the write in their respective systems.

As noted above, the embodiment of 3 data storage systems of FIG. 3 illustrates a configuration with a topology where the systems 410 and 490 are not directly connected to one another and communicate with each other only indirectly through the system 430. Thus, the embodiment of FIG. 7C may be characterized as utilizing indirect replication and synchronization for writes to the stretched LUN A that are received at either the system 490 or the system 410. As discussed above, writes to the stretched LUN A that are received at the system 410 are synchronously replicated to the system 430, and then synchronously replicated from the system 430 to the system 490. In a similar manner, to the stretched LUN A that are received at the system 490 are synchronously replicated to the system 430, and then synchronously replicated from the system 430 to the system 490. In contrast, writes issued to the stretched LUN A received at the system 430 are directly synchronously replicated from the system 430 to both the systems 410 and 490.

Figure 7D:
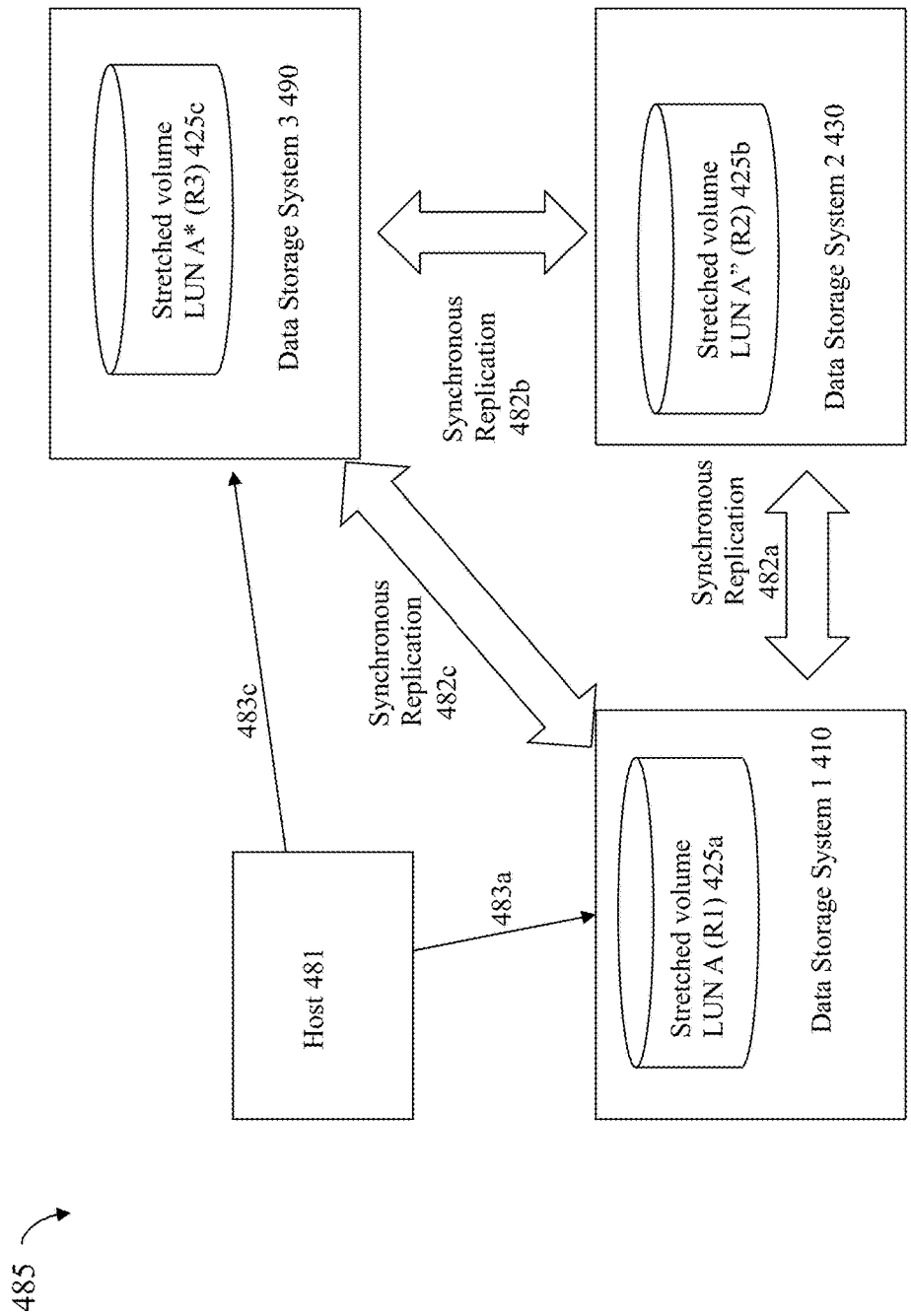

As a variation, reference is made to FIG. 7D illustrating an embodiment of 3 data storage systems all configured with direct communication with one another. The example 485 includes similarly numbered systems and elements as in FIG. 7C with the addition of a third direct link 482c used for bidirectional synchronous replication directly between the systems 410 and 490. In this example 485, a first write sent by the host 481 over the connection 483a may be received at the system 410. In response to the system 410 receiving the first write over the connection 483a, the system 410 may synchronously replicate the first write over multiple replication links 482c and 482a, respectively, to the systems 490 and 430. In this example 485, a second write sent by the host 481 over the connection 483c may be received at the system 490. In response to the system 490 receiving the second write, the system 490 may synchronously replicate the first write over multiple replication links 482c and 482b, respectively, to the systems 410 and 430.

In such embodiments in accordance with the techniques herein, the stretched LUN or volume may be generally configured from N volume instances on N different data storage systems in a metro cluster configuration, where the N volume instances may be configured as identical volumes and recognized by the host as the same volume or LUN, and where N is equal to or greater than 2. The N data storage systems may be configured with any suitable number of bi directional synchronous replication links between pairs of the N data storage systems. Depending on the particular metro cluster configuration and topology, the replication links may be used to provide for indirect as well as direct replication of writes directed to the stretched LUN or volume. FIG. 7C provides an example illustrating an embodiment where there are not direct bidirectional synchronous replication links between each pair of data storage systems of the metro cluster. In contrast, FIG. 7D provides an example illustrating an embodiment where there are direct bidirectional synchronous replication links between each pair of data storage systems of the metro cluster. Generally, the techniques described herein may be used in connection with any suitable metro cluster configuration where there may or may not be direct bidirectional replication links between each pair of data storage systems of the metro cluster. In the event that each pair of systems of the metro cluster are not directly connected to one another with a bidirectional synchronous replication link, writes may be indirectly replication in a synchronous manner through multiple systems where the number of multiple systems may vary with the particular configuration.

As discussed above and elsewhere herein, a stretched volume or LUN may be represented and configured as N volume or LUN instances located at N different physical data storage systems in a metro cluster configuration, where N>2. A stretched LUN or volume may be used for any suitable purpose or application.

Generally, such as with reference to FIG. 7C, the multiple data storage systems 410, 430 and 490, respectively, including the multiple volume instances 425a-c, configured as the same stretched volume are synchronized in multiple aspects in order to have the multiple volume instances appear to the host as the same stretched volume or LUN. For example, as discussed above, data of the multiple volume instances 425a-c configured as the same stretched volume or LUN is synchronized. In such implementations with a stretched LUN or volume exposed to the host 481 over multiple paths 483a-c from multiple data storage systems 410, 430 and 490, the host 481 may issue a read I/O command over any one of the multiple paths 483a-c to read data from a target logical address of the stretched volume. In response, the host receives the same read data independent of the particular one of the multiple paths over which the host sends the read I/O. In a similar manner, the host 481 may issue a write I/O command over any one of the multiple paths 483a-c to the stretched volume or LUN resulting in all multiple volume instances 425a-c of the stretched volume being updated with the data written by the write I/O command.

In at least one embodiment in accordance with the techniques herein, the metro cluster configuration may generally include more than two data storage systems, where the metro cluster configuration may also utilize the TTL mechanism and techniques described in U.S. patent application Ser. No. 16/246,984, filed Jan. 14, 2019, now U.S. Patent Publication No. 2020/0226145 A1, published Jul. 16, 2020, entitled "Storage Systems Configured with Time-to-Live Clustering for Replication in Active-Active Configurations, Meiri, which is noted above and incorporated by reference herein. Further detail regarding use of the TTL mechanism is also described elsewhere herein.

Described in the following paragraphs are various techniques that may be used in connection with an N-way active/active metro cluster configuration. N denotes a number of data storage systems configured in a metro cluster configuration and N generally may be 3 or more.

The FIG. 7C illustrates one example metro cluster configuration with 3 systems and 3 LUNs 425a-c configured as the same stretched volume. The FIG. 7D illustrates another example metro cluster configuration with 3 systems and 3 LUNs 425*a-c* configured as the same stretched volume.

In the following paragraphs, illustrative examples may be provided in which a stretched volume is configured from N volumes in a metro cluster configuration of N data storage systems. Some examples may use particular values for N, such as N=3, such as illustrated in FIGS. 7C and 7D. More generally, the techniques herein may be further extended for use with a stretched volume configured from any suitable number of configured volumes, N, on N different data storage systems or appliances in a metro cluster configuration, where N is greater than 2. Note that this follows from the generalization of a stretched volume or LUN configuration as described elsewhere herein such as, for example, in connection with FIGS. 7C and 7D.

The following paragraphs provide further details regarding various aspects of a metro cluster configuration of N>2 systems that may be used in connection with a stretched volume configured from N>2 volumes, where each of the N volumes is on a different one of the N systems.

The techniques herein may be used in connection with any topology of a configured metro cluster of 3 or more data storage systems. FIGS. 7C and 7D illustrate examples of different synchronous replication configurations of a metro cluster of 3 systems.

Figure 7E:
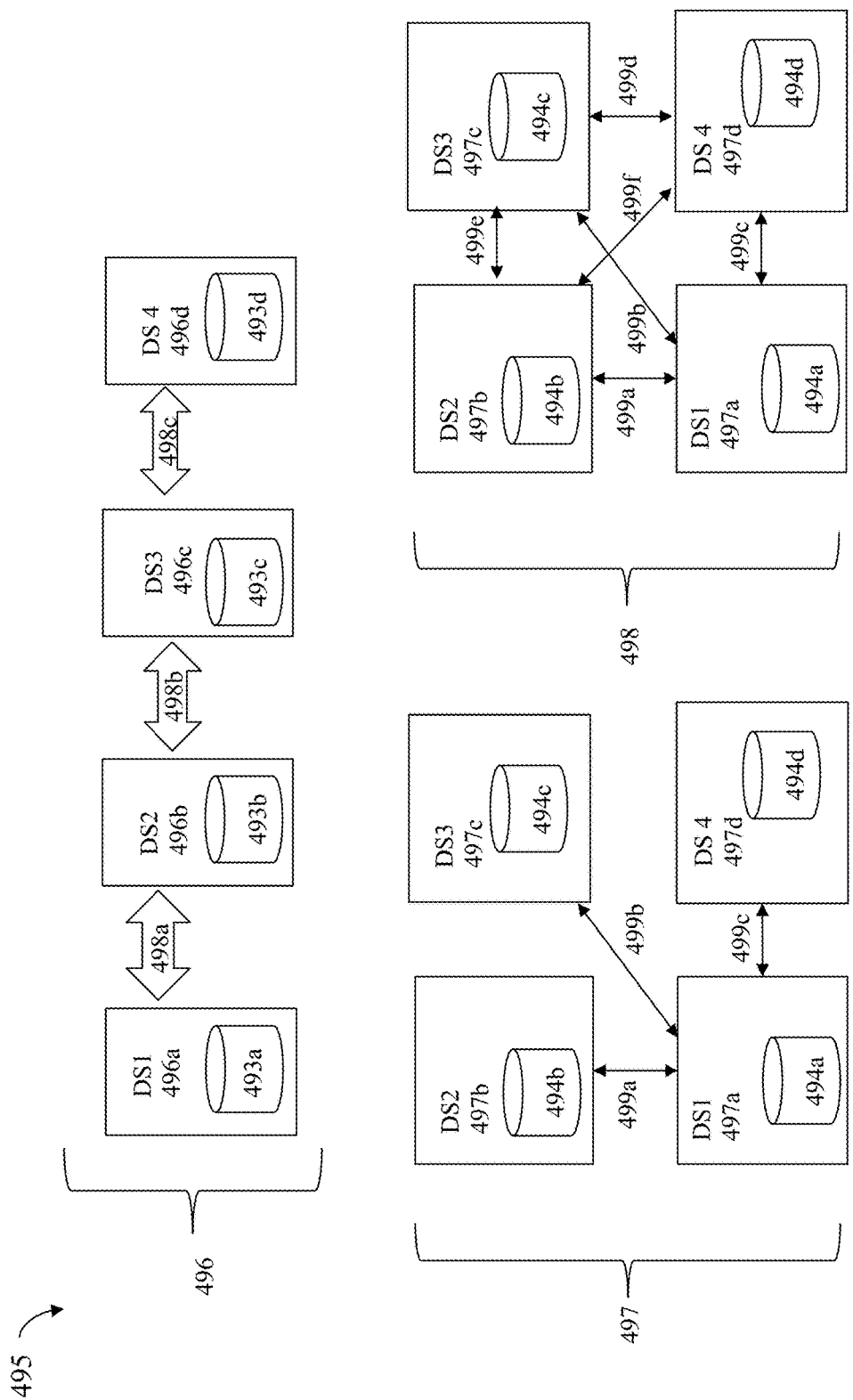

Referring to FIG. 7E, shown is an example of other metro cluster configurations of 4 systems in embodiments in accordance with the techniques herein.

The element 496 includes a first metro cluster configuration of 4 data storage systems (DSs) 496*a-d* that may utilize the techniques herein. The element 496 illustrates a daisy chain or linear topology of a single replication leg of the 4 systems 496*a-d*, where the elements 498*a-c* denote bidirectional synchronous replication links between the systems 496*a-d*. Generally one or more hosts (not illustrated for simplicity) may each be connected to one or more of the systems 496*a-d* and may issue I/Os over such connections to one or more of the systems 496*a-d*. Additionally, one or more stretched volumes or LUNs may be configured as described elsewhere herein. For example, the elements 493*a-d* may denote local LUNs or volume instances, respectively, on the systems 496*a-d*, where the LUNs or volumes 493*a-d* may all be configured to have the same identity and where the LUNs or volumes 493*a-d* are exposed to one or more hosts as the same stretched volume or LUN A1.

As a first example, writes from a host directed to the stretched volume or LUN A1 may be received at the DS1 496*a*, where such writes are stored locally on the DS1 496*a* (e.g., in a cache of the DS1 496*a* and then to the LUN 493*a*) and then synchronously replicated over the link 498*a* to the DS2 496*b* where the writes are stored locally on the DS2 496*b* (e.g. in the cache of the DS2 496*b* and then to the LUN 493*b*). Subsequently, the writes are then synchronously replicated over the link 498*b* from the DS2 496*b* to the DS3 496*c*, where the writes are stored locally on the DS3 496*c* (e.g., in the cache of the DS3 496*c* and then to the LUN 493*c*). Subsequently, the writes are then further synchronously replicated over the link 498*c* from the DS3 496*c* to the DS4 496*d*, where the writes are stored locally on the DS4 496*d* (e.g., in the cache of the DS4 496*d* and then to the LUN 493*d*).

As another example, second writes from a host directed to the stretched volume or LUN A1 may be received at the DS3 496*c*, where the writes are stored locally on the DS3 496*c* (e.g., in the cache of the DS3 496*c* and then to the LUN 493*c*). The second writes are synchronously replicated to all systems to the left of the DS3 496*c* and also to all systems to the right of the DS3 496*c*. To further illustrate, the second writes are synchronously replicated over the link 498*c* from the DS3 496*c* to the DS4 496*d*, where the second writes are stored locally on the DS4 496*d* (e.g., in the cache of the DS4 496*d* and then to the LUN 493*d*). Additionally, the second writes are synchronously replicated from the DS3 496*c* over the link 498*b* to the DS2 496*b* (where the second writes are stored locally such as in the cache of the DS2 496*b* and then to the LUN 493*b*), and then over the link 498*a* from the DS2 496*b* to the DS1 496*a* (where the second writes are stored local such as in the cache of the DS1 496*a* and then to the LUN 493*a*). In at least one embodiment, the synchronous replication of the second writes over the links 498*b* and 498*c* may be done in parallel.

The element 497 includes a second metro cluster configuration of 4 data storage systems (DSs) 497*a-d* that may utilize the techniques herein. The element 497 illustrates a topology including 3 replication legs, where the elements 499*a-c* denote bidirectional synchronous replication links between the systems 497*a-d*. Generally one or more hosts (not illustrated for simplicity) may each be connected to one or more of the systems 497*a-d* and may issue I/Os over such connections to one or more of the systems 497*a-d*. Additionally, one or more stretched volumes or LUNs may be configured as described elsewhere herein. For example, the elements 494*a-d* may denote local LUNs or volume instances, respectively, on the systems 497*a-d*, where the LUNs or volumes 494*a-d* may all be configured to have the same identity and where the LUNs or volumes 494*a-d* are exposed to one or more hosts as the same stretched volume or LUN A2.

As an example, third writes from a host directed to the stretched volume or LUN A2 may be received at the DS1 497*a*, where such third writes are stored locally on the DS1 497*a* (e.g., in the cache of the DS1 497*a* and then on the LUN 494*a*); synchronously replicated over the link 499*a* to the DS2 497*b* (and stored locally in the cache of the DS2 497*b* and then on the LUN 494*b*), synchronously replicated over the link 499*b* to the DS3 497*c* (and stored locally in the cache of the DS3 497*c* and then on the LUN 494*c*), and synchronously replicated over the link 499*c* to the DS4 497*d* (and stored locally in the cache of the DS4 497*d* and then on the LUN 494*d*). In one embodiment, the foregoing synchronous replications of the third writes over the links 499*a-c* may all be done in parallel.

As another example, fourth writes from a host directed to the stretched volume or LUN A2 may be received at the DS3 497*c*. The fourth writes are stored locally (e.g., in a cache of the system 497*c* and then on the LUN 494*d*) and synchronously replicated from the DS3 497*c* over the link 499*b* to the DS1 497*a* (where the fourth writes are stored locally in a cache of the system DS1 497*a* and then on the LUN 494*a*). Subsequently, the fourth writes are synchronously replicated from DS1 497*a* to the systems DS2 497*b* and DS4 497*d*, respectively, over the links 499*a* and 499*c*. On the systems 497*b* and 497*d*, the fourth writes may be stored locally such as in caches of such systems and then respectively written out from the caches to the LUNs 494*b* and 494*d*. In at least one embodiment, the synchronous replication over the links 499*a* and 499*c* may be done in parallel.

The element 498 includes a third metro cluster configuration of 4 data storage systems (DSs) 497*a-d* that may utilize the techniques herein. The element 498 includes systems 497*a-d*, volume or LUNs 494*a-d* configured as the stretched volume or LUN A2, and bidirectional synchronous replication links 499*a-c* as in the configuration 497. Additionally, the element 498 includes the additional bidirectional synchronous replication links 499*d-f*. Thus, the embodiment of element 498 provides bidirectional synchronous replication link 449*a-f* used in connection with replicating writes of the stretched volume or LUN A2 whereby there is a direct bidirectional synchronous replication link or connection between each pair of systems of the metro cluster configuration.

As an example, fifth writes from a host directed to the stretched volume or LUN A2 may be received at the DS3 497*c*. The fifth writes are stored locally (e.g., in a cache of the system 497*c* and then on the LUN 494*d*) and synchronously replicated from the DS3 497*c* over the link 499*b* to the DS1 497*a* (where the fourth writes are stored locally in a cache of the system DS1 497*a* and then on the LUN 494*a*). Additionally, the fifth writes are synchronously replicated from the DS3 497*c* over the link 499*e* to the DS2 497*b* (where the fifth writes are stored locally in the cache of the system DS2 497*b* and then on the LUN 494*b*). Additionally, the fifth writes are synchronously replicated from the DS3 497*c* over the link 499*d* to the DS4 497*d* (where the fifth writes are stored locally in the cache of the system DS4 497*d* and then on the LUN 494*d*). On the systems 497*b* and 497*d*, the fifth writes may be stored locally such as in caches of such systems and then respectively written out from the caches to the LUNs 494*b* and 494*d*. In at least one embodiment, the synchronous replication over the links 499*b*, 499*b* and 499*d* may be done in parallel.

The metro cluster configurations of N=4 in FIG. 7E are further examples of metro cluster configurations that may use the techniques described herein.

The following paragraphs describe, for example, performance, write collision and lock contention resolution, aspects of recovery, and metro cluster behavior in at least one embodiment in accordance with the techniques herein with a metro cluster configuration of 3 or more data storage systems or appliances. More generally, the techniques described herein may also be used in connection with a metro cluster configuration of N=2 or more data storage systems or appliances.

Generally, a stretched volume may be configured from N volumes of N data storage systems configured as a metro cluster. N may be an integer value that is 2 or more. Each of the N volumes may be included in a different one of the N data storage systems. The N volumes may be exposed to one or more hosts as a same logical volume having a same unique identifier over a plurality of paths from the N data storage systems. The N volumes may be configured for multidirectional synchronous replication whereby a write directed to the stretched volume received at any one of the N data storage systems is synchronously replicated to every other one of the N data storage systems of the cluster. Depending on the particular configuration of the metro cluster, systems of the metro cluster may be directly or indirectly connected to one another so that a host write to the stretched volume received at a first system of the metro cluster may be directly or indirectly replicated to each other system of the metro cluster. In a similar manner, depending on the metro cluster configuration and connections between the systems of the metro cluster, the data storage systems of the metro cluster may communicate with one another directly or indirectly in connection with sending messages and replies in connection with performing processing of the techniques described in the following paragraphs.

The foregoing and other aspects of the techniques herein are described in more detail in the following paragraphs.

In at least one embodiment, assume there are N data storage systems in a metro cluster configuration, where N>2.

A stretched volume or LUN may be configured from N volume or LUN instances, respectively, on the N systems. A write directed to the stretched volume or LUN received on any of the N systems may be synchronously replicated to all peers and written locally in the system that received the write. In connection with such a metro cluster configuration, synchronous replication of the write to connected peer systems may be performed in parallel where possible depending on the topology of the metro cluster configuration. Statistically, in a metro cluster of 3 or more systems, the write latency may have an upper bound determined by the maximum amount of time it takes to complete one local write and N-1 remote writes. In at least one embodiment, some or all of the N-1 remote writes (e.g., synchronous replication of the write to the other remote peer systems) may be performed in parallel where possible depending on the metro cluster configuration and topology. In at least one embodiment under normal operating conditions and with enough CPU resources and reasonable distances between the N data storage systems of the metro cluster configuration, the write latency for completing the host I/O received at one data storage system of the metro cluster configuration may be, for example, a few milliseconds. Of course, the write latency for the write may vary further with the number of systems N in the metro cluster configuration.

What will now be described are techniques that may be used to handle lock contention and write collisions in a metro cluster configuration in at least one embodiment where the metro cluster configuration has more than two data storage systems.

Multiple hosts may issue multiple writes at the same time in parallel to multiple data storage systems of the metro cluster configuration, where such multiple writes attempt to modify the same target logical address at the same time. For example a first host may issue a first write to a first data storage system of the metro cluster, and a second host may issue a second write to a second data storage system of the metro cluster. The first and second writes may both write to the same target logical address or LBA of the same LUN. The first and second writes may be received, respectively, by the first and second data storage systems at the same time for processing. In this case, a write collision occurs. Moreover, even when the foregoing two writes from the two hosts are writing to adjacent logical addresses, or more generally, two logical addresses that share the same memory page, a collision or contention can occur since both data storage systems receiving the writes may attempt to lock the same memory page storing contents of both the two logical addresses.

With a metro cluster configuration of 2 systems, for a write to a target logical address, at least one existing technique may require that a lock be acquired that provides exclusive access to the target logical address, or page mapped to the target logical address, on both systems before the write is allowed to proceed to modify the target logical address. The page may be mapped to a range of logical addresses including the target logical address, whereby the page may correspond to a page of memory, cache storage, and/or non-volatile storage at which the content or data of the target logical address is stored. A write collision, lock collision or lock contention occurs when two writes, such as the two writes noted above, try to lock the same target logical address, or page including the target logical address, at the same time. In a metro cluster configuration with 2 data storage systems, one existing solution provides for a first of the two writes withdrawing and allowing the other of the two writes to complete before the first write attempts to acquire the necessary locks on the target logical address on both systems. In the 2 system technique, a write is executed only after the necessary locks on the target logical address are obtained on both data storage systems.

The complexity of the scenario further increases with more than two data storage systems in the metro cluster configuration, and the following paragraphs present multiple options to handle and resolve write collisions and lock contention that may be encountered when processing received write operations directed to a stretched volume or LUN. In the following options the penalty for a write collision can be high in that, for example, one of the writes may withdraw, unlock all resources, wait and retry. Therefore, an embodiment in accordance with the techniques herein may select a fine granularity locking scheme with a relatively small page size to attempt to minimize write collisions or lock contentions for the same page of logical addresses. For example, in at least one embodiment, a lock may be obtained per page where the page size may be, for example, 1 MB or as small as 4 KB. In this manner, locations or target logical addresses such as of a stretched volume may be partitioned into larger pages and a lock may be associated with each page. In order to write to a target logical address, the lock providing exclusive access for the page including the target logical address is acquired. In at least one embodiment, each system of the metro cluster may have its own set of locks (local system locks) for the pages of logical addresses, where the pages may be mapped to storage, such as volatile memory and/or non-volatile storage, storing the content or data of the logical addresses mapped to the pages. Thus, acquiring a lock for a page across the metro cluster may include acquiring the lock (e.g., the local system lock) for the page on each of the systems of metro cluster.

In at least one embodiment, the following three phase processing may be performed in sequential order to execute a write that writes to a target logical address, where the write is directed to a stretched volume configured from N volumes of N different systems of the metro cluster configuration, and where N>2:

1) acquiring a lock for the page including the target logical address on all data storage systems of the metro cluster;

2) responsive to acquiring the lock for the page on all systems of the metro cluster, executing the write to the target logical address on all the data storage systems of the metro cluster; and 3) responsive to completion of executing the write to the target logical address on all systems of the metro cluster, releasing the lock for the page on all systems of the metro cluster.

In the above three phase write processing that includes 3 phases for processing a write, the 3 phases may correspond to 3 round trips or iterations of messaging between the systems of cluster.

As a variation to the above, in at least one embodiment, the following two phase processing may be performed in sequential order to execute a write that writes to a target logical address, where the write is directed to a stretched volume configured from N volumes of N different systems of the metro cluster configuration, and where N>2:

1) acquiring a lock for the page including the target logical address on all data storage systems of the metro cluster; and 2) responsive to acquiring the lock for the page on all systems of the metro cluster, on each system of the metro cluster:

a) executing or applying the write to the target logical address; and b) releasing the lock on the page of the system after completing 2a) on the system.

In the above two phase write processing that includes 2 phases for processing a write, the 2 phases may correspond to 2 round trips or iterations of messaging across the systems of the metro cluster where, in the second phase, round trip or iteration over the systems of the metro cluster, the lock for a page on a system is released in phase 2b) following execution or application of the write to the target logical address. In at least one embodiment, each system of the metro cluster may have a lock for the page that must be acquired in phase 1) prior to proceeding with further processing of the write. For example, in a metro cluster of 3 systems, 3 locks for the 3 pages containing the content or data of the target logical address may be acquired, where each of the 3 locks is on a different one of the 3 systems of the metro cluster.

For example, reference is made to FIG. 8 including the hosts 502, 504, and a metro cluster configuration of the 3 data storage systems 410, 430 and 490 as previously described in connection with FIG. 6. Assume that the host 1 502 issues a first write I/O request, write 1 502*a,* over the connection 506*a* to the system 410. The first write I/O 502*a* may write first data to target logical address A1 on the stretched volume LUN A. In this example, A1 may be included in the logical address range mapped to the page X1 storing the content A1. Further, on the system 410 the page X1 has a corresponding lock L1a 510*a,* on the system 430 the page X1 has a corresponding lock L1b 510*b,* and on the system 490 the page X1 has a corresponding lock L1c 510*c.* Based on normal write processing such as described above (e.g., using either the two-phase or three phase write processing flow), the system 410 acquires the 3 locks 510*a-c* for the page X1 including A1 on the systems 410, 430 and 490. Subsequently once the locks 510*a-c* for the page X1 including A1 are acquired on the 3 systems, execution of the write 502*a* may proceed locally on the system 410 and remotely on the systems 430 and 490, whereby the data written by the write 502*a* is stored at the target logical address A1 as denoted in the pages of memory 510*a-c,* respectively, on the systems 410, 430 and 490.

In at least one embodiment, a lock contention may be detected in the step 1) of the above-noted two phase or three phase write processing when attempting to acquire the locks 510*a-c* for the page X1 including the target logical address A1 on all data storage systems 410, 430 and 490 of the metro cluster. For example, reference is made to FIG. 8. Assume that the host 1 502 issues the first write I/O request, write 1 502*a,* over the connection 506*a* to the system 410. The first write I/O 502*a* may write first data to target logical address A1 on the stretched volume LUN A. Assume that a second write I/O 504*a* is issued from the host 504 over the connection 506*b* to the system 430. The second write I/O 54*a* may write second data to the same target logical address A1 on the same stretched LUN A. Assume that the two writes 502*a,* 504*a* are issued at the same time or in parallel and thus received and processed, respectively, by the systems 410 and 430 at the same time. In this case, first processing by a first thread or process on the system 410 for the write 502*a* may acquire the lock 510*a* and then attempt to acquire the locks 510*b* and 510*c.* Second processing by a second process or thread on the system 430 for the write 504*a* may acquire the lock 510*b* and then attempt to acquire the locks 510*a* and 510*c.* The foregoing first and second processing performed, respectively, by the first and second threads or processes may execute at the same time. However, the first processing by the first thread or process may fail to acquire the lock 510b since it is already acquired or held by the second thread. Similarly, the second processing of the second thread or process may fail to acquire the lock 510a since it is already acquired or held by the first thread. Thus, the lock contention has occurred in that processing performed in parallel at the same time for two different writes tries to acquire a lock on a page that is currently held by another. The foregoing is an example of a potential deadlock situation where, for example, the first thread or process of the system 410 is blocked and waits to acquire the lock 510b held by the second thread or process of the system 430; and the second process or thread of the system 430 is blocked and waits to acquire the lock 510a held by the first thread or process of the system 410.

To avoid lock contention and also possible deadlock scenarios such as just described, a first option or solution (sometimes also referred to as option 1) is described in the following paragraphs and with reference to the flowchart 600 of FIG. 9.

In connection with discussion herein, a lock on a page may be requested and acquired in connection with processing a write operation received by a system of the metro cluster. In at least one embodiment in accordance with the techniques herein, when the lock on the page is acquired by, or granted to, a system of the metro cluster, information may be recorded regarding the lock. The information may, for example include the current system that holds the lock for the particular write operation. Thus the information may identify the current system holding the lock and also the write operation for which the lock is held. Write operations in embodiments described herein may be uniquely identified, for example, using a write I/O identifier. In some contexts and description herein, the current system holding the lock for the page may also be characterized as the owner of the lock.

In connection with examples and description in the following paragraphs, the techniques herein may be described with respect to a write that writes to a single target logical address mapped to a single page. More generally, the techniques herein may be performed with respect to a write operation that writes to multiple target logical addresses that may be mapped to multiple pages. In this latter case, it is straight forward to adapt the processing described herein to acquire locks across systems of the metro cluster to provide exclusive access to the multiple pages when processing the write.

At the step 602, processing may be performed to define a random permutation on 1, . . . ,N. This permutation defines the data storage system hierarchy for the N data storage system of the metro cluster. The permutation may be used in connection with processing write operations within the metro cluster for a specified time period. All systems of the metro cluster are informed of the permutation and all systems in the metro cluster may then use the same random permutation and associated hierarchy. Generally, the permutation defines a ranking of the N systems in the metro cluster used in subsequent processing steps of FIG. 9. From the step 602, control proceeds to the step 604.

At the step 604, a data storage system of the metro cluster receives a write from a host. The write may be directed to a target logical address of a stretched volume or LUN configured from multiple local volumes or LUNs across systems of the metro cluster. For example, as described in connection with FIG. 8, the system 410 receives the write 502a from the host 502. The data storage system receiving the write may be referred to as the originator system or write originator system. The write may write data to a target logical address, such as A1, included in a particular page, such as X1. From the step 604, control proceeds to the step 606.

At the step 606, the write originator system that received the current write tries to acquire the lock of its own local page for the target logical address. If the lock for the page on the write originator system (e.g., local lock) is already held by another system or thread for another write, processing of the current write blocks and waits until the lock for the page on the originator system is released where, upon its release, the originator system acquires its local lock for the page. To illustrate, consider the write 502a received by the originator system 410. In the step 606, processing of the write 502a attempts to acquire the local lock 510a for the page X1 including the target logical address A1. From the step 606, control proceeds to the step 608.

At the step 608, the originator system that received the current write from the host sends a multicast to all remote peer systems of the metro cluster requesting to obtain their local or system locks on the page including the target logical address of the write. For example, in connection with the write 502a, the system 410 sends the multicast to the systems 430 and 490 requesting to obtain the local locks 510b and 510c. From the step 608, control proceeds to the step 610.

At the step 610, for each remote or peer system in the metro cluster configuration receiving the lock request issued in the step 608 from the write originator:

a. If the lock for the page of the remote or peer system is free, have the originator system acquire the lock for the page of the remote or peer system, and return lock acquired/success in response to the lock request.

b. If the page of the remote or peer system is locked (e.g. held or owned) by a system ranked lower in the hierarchy than the originator system, the request by the originator system for the lock on the page of the remote or local system blocks or waits for the page lock on the remote system to be released. Once released, the originator system proceeds to acquire the lock of the remote or local system for the requested page. The remote or peer system returns lock acquired/success in response to the lock request.

c. If the page of the remote or peer system is locked (e.g., held or owned) by a system ranked higher in the hierarchy than the originator system, a lock failure is returned from the remote or peer system in response to the lock request. As described below in b) of the step 614, in this case the originator system will subsequently release or unlock any locks it holds for the current write being processed (e.g., the original system will subsequently release or unlock any locks for the page mapped to A1 on any system of the metro cluster). From the step 610, control proceeds to the step 612.

At the step 612, the write originator system waits for replies or responses to the multicast lock request issued in the step 608 from all remote peer systems in the metro cluster. From the step 612, control proceeds to the step 614.

At the step 614, responsive to the write originator system receiving replies or responses to the multicast lock request of the step 608 from all remote or peer systems of the metro cluster:

a) If all remote or peer system lock requests succeeded, the write originator system proceeds to apply the write data locally and also send the write data to the remote or peer systems of the cluster. All remote or peer systems receiving the write data may then apply the write data; unlock their local system pages that are mapped to A1 and are held by the originator system for the current write operation; and return a success/good status to the originator system (e.g., whereby the current write servicing is complete and a response/acknowledgement regarding completion of the current write may be returned to the host).

b) If any remote or peer system returned lock failure, the write originator system sends a multicast to all remote peers of the cluster releasing all locks for the page mapped to A1 held by the write originator for the current write being processed. Also processing is performed to unlock or release the local lock on the page mapped to A1 of the write originator system for the current write, and then retry write processing for the current write by proceeding to the step 606. Thus if the condition b) of the step 614 evaluates to true, processing noted above for the condition b) of the step 614 is performed which ends with transferring control to the step 606 to continue processing of the write received in the step 604 by reattempting to acquire the necessary page locks of the metro cluster systems for the received write. At some subsequent point in time, the current write processing succeeds and completes, whereby the step 614a is performed. If the condition a) of the step 614 evaluates to true, processing for the current write received in the step 604 may stop after completing the processing noted above for condition a) of the step 614.

Figure 8:
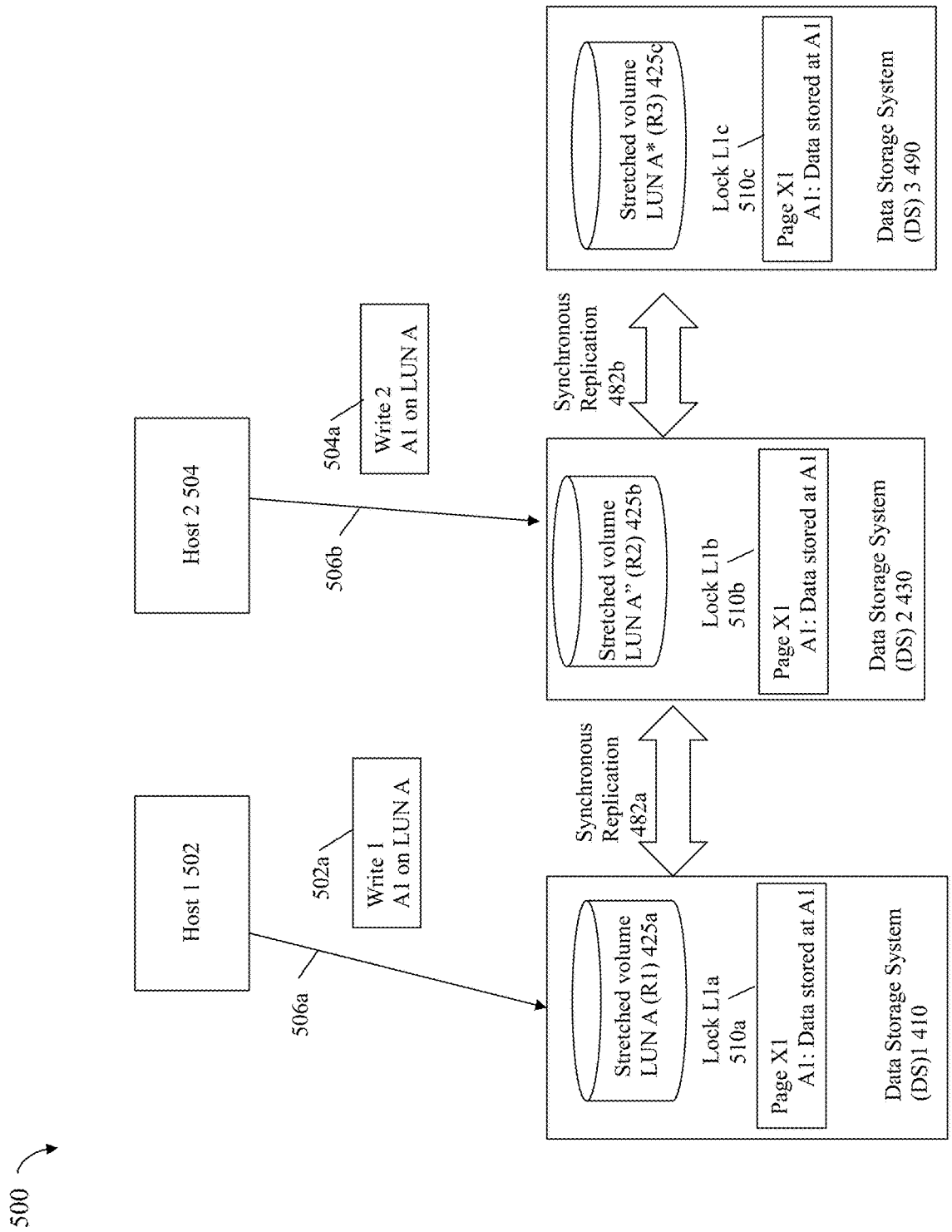
Figure 9:
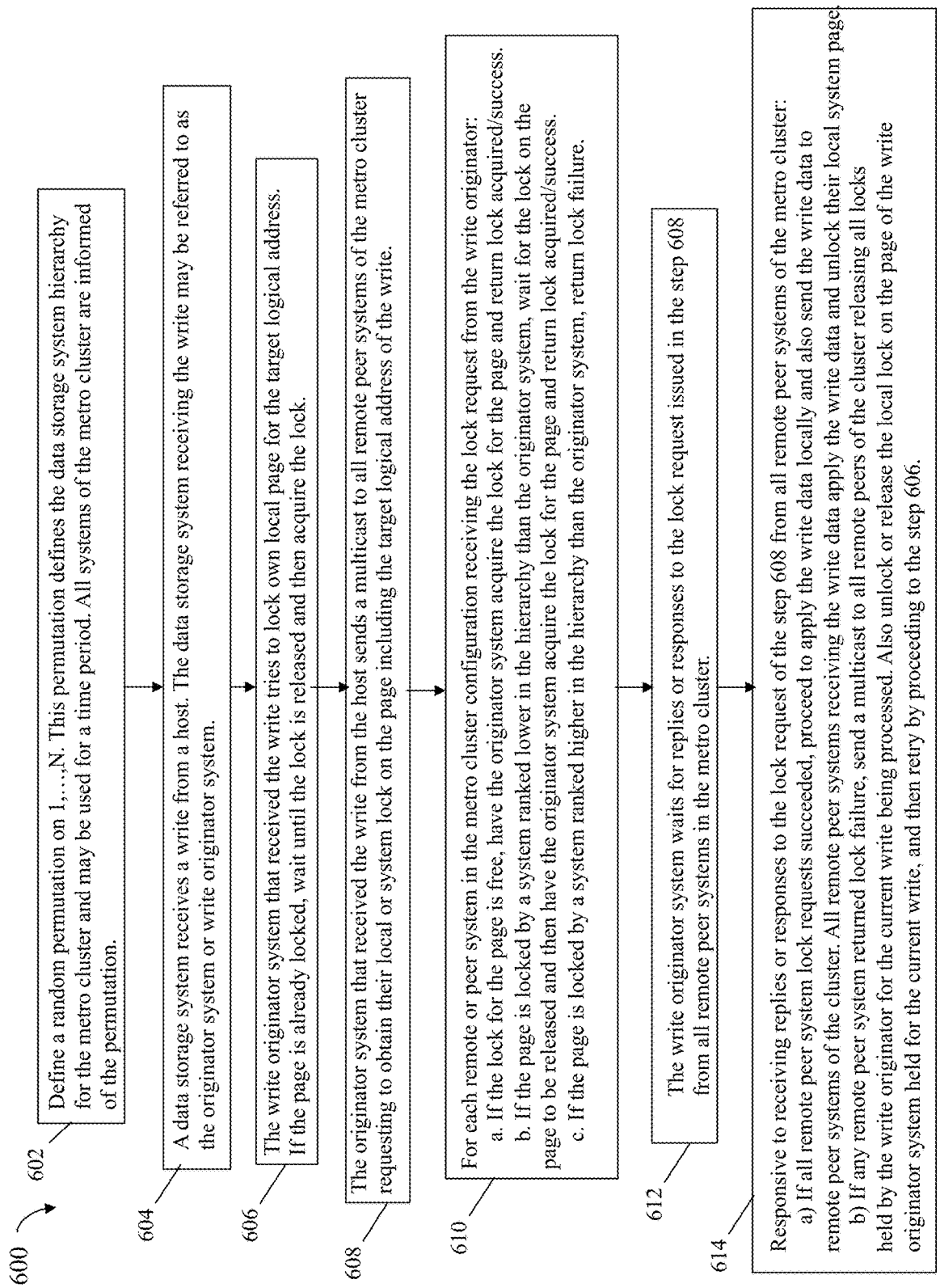
FIGS. 9, 10A, 10B, 11A and 11B are flowcharts of processing steps that may be performed in embodiments in accordance with the techniques herein.

To further illustrate with reference to FIG. 8, assume the system 410 is performing the processing of FIG. 9 to service the received write 502a. In this case, the system 410 is the write originator and the systems 430 and 490 are remote peers of the metro cluster. Assume that the system 410 acquires (step 606) its own local lock for the page X1 mapped to the target logical address A1 of the write 502. The system 410 the performs the step 608 processing and sends a multicast to the systems 430 and 490 requesting the locks 510b and 510c for their local pages mapped to A1. Assume that the system 410 is able to acquire the lock 510c on the system 490 but not the lock 510b since the lock 510b is currently held, taken or acquired by the system 430 in connection with processing of the write 504a. As a first case, assume that the permutation defines a ranking where the system 410 is ranked higher than the system 430. In this first case (e, g., the step 610 b)) the system 410 waits for the system 430 to release the lock 510b and, in response, the system 410 may then acquire the lock 510b and continue processing. As a second alternative case, assume that the permutation defines a ranking where the system 410 is ranked lower than the system 430. In this second case (e.g., the step 610c)), a lock failure is returned from the system 430 to the system 410. Subsequently, in the step 614b), the system 410 releases its acquired locks 510a and 510c, and then retries the write processing for the current write by proceeding to the step 606. In this second case, the write processing of the write 504a has a state where the system 430 has acquired the lock 510b but is blocked waiting to acquire the locks 510a and 510c. In response to the release of the locks 510a and 510c by the system 410, the system 430 may now acquire the locks 510a and 510c and continue write processing for the write 504a. In this second case, the system 410 processing the write 502a may be characterized as yielding to, or backing off, write processing of the write 502a, thereby allowing the higher ranked system 430 to first process the write 504a. In this manner, the hierarchy defined by the random permutation may be used to avoid deadlocks in response to lock contention or conflict among the systems of the cluster when servicing received write I/Os 502a and 504a.

As can be seen from the above description of processing of FIG. 9, it is possible that a write may be attempted or retried multiple times before it succeeds. For example, condition b) of the step 614 may evaluate to true where control returns to the step 606 to repeat processing of the steps 606, 608, 610, 612 and 614 again for the write operation.

In at least one embodiment, the method or option 1 of FIG. 9 may be selected for use in metro cluster configurations with a relatively small number of systems in the metro cluster configuration. For example, the processing of FIG. 9 may be used in connection with metro cluster configurations including 3 or 4 data storage systems. Additionally, in at least one embodiment, the method or option 1 of FIG. 9 may be selected for use in connection with systems and a metro cluster configuration having a relatively low write frequency below a specified threshold. For example, the method or option 1 of FIG. 9 may be selected for use with a metro cluster configuration that has 90/10 Read/Write ratio. In at least one embodiment, the method or option 1 of FIG. 9 may be selected for use with one or more application I/O patterns, where different hosts or clients issuing writes typically write to different portions of the same stretched volume thereby minimizing write collisions and/or reducing lock contention.

Thus in connection with the embodiment of FIG. 9, the hierarchy or ranking of the systems in the metro cluster may be used to avoid potential deadlock scenarios that may occur, for example, when two threads or processes for two writes received at the same time at two different systems of the metro cluster both attempt to acquire the same set of page locks across the metro cluster. In such an embodiment using the processing of FIG. 9, the permutation and associated system ranking provides a bias that may result in increased performance of write processing for higher ranked systems in comparison to relatively lower ranked systems. In such an embodiment, a first system ranked lower than a second system is more likely than the second system to have to retry write processing for the same write (e.g., the first system is expected to yield to more higher ranked systems than the second system in response to a lock contention or conflict).

In at least one embodiment, to create fairness, the random permutation defining the hierarchy in the step 602 may be changed periodically such as, for example, every 30 seconds or some other suitable time period. Described below is processing that may be performed to determine a new permutation periodically in at least one embodiment in accordance with the techniques herein.

In a first step S1, one of the system of the metro cluster configuration may initiate a permutation change. For example, the one system initiating the permutation change may be the system with the highest serial number. Generally, the initiating system may be selected in any suitable manner. From the step S1, control proceeds to the step S2.

At the step S2, the initiating system sends a message to all other systems in the metro cluster configuration that a permutation change is pending. In response, all systems of the metro cluster discard the current permutation and transition to a pending mode and no permutation is in use or selected for use. In the pending mode, a collision or lock contention may be detected where a lock requested by a first system when processing a current write operation is currently held by another second system. In response to detecting this collision or contention for the lock, any/all locks currently held/acquired for the current write operation (e.g., held or owned by the first system for the current write operation) are released, and processing may proceed to retry acquiring the needed locks for the current write operation. For example, processing may proceed to the step 606 of FIG. 9 to continue processing to retry the write operation. In at least one embodiment, an additional small waiting period may be introduced in servicing the current write operation whereby upon detecting the collision or lock contention as noted above for the current write operation, any/all locks currently held/acquired for the write operation are released, and processing may wait an amount of time before proceeding to the step 606 to retry acquiring the needed locks for the current write operation. The foregoing performed in the step DS2 responsive to detecting a collision or contention for the lock may be done to avoid deadlock scenarios that may possibly occur while transitioning or changing the permutation used in the metro cluster. From the step S2, control proceeds to the step S3.

In the step S3, the initiating system selects a new random permutation of the systems 1 through N of the cluster, where the new random permutation will be used as a new ranking of the systems in the metro cluster. From the step S3, control proceeds to the step S4 where any incomplete writes of the metro cluster which use the old or existing random permutation are allowed to complete or drain. In at least one embodiment, the incomplete writes may be those writes for which write processing has commenced but not completed on the systems of the cluster. From the step S4, once all incomplete writes using the old or existing random permutation are drained, control proceeds to the step S5.

In the step S5, the initiating system sends the new random permutation to all remote or peer systems of the metro cluster whereby the metro cluster transitions out of the permutation change or pending mode and each remote or peer system may begin processing writes using the flow of FIG. 9 with the new random permutation upon receipt. Additionally, in the step S5, the initiating system also begins using the new random permutation in connection with write processing in accordance with FIG. 9. Generally, all systems of the metro cluster are informed of the new permutation and all systems in the metro cluster may then use the same random permutation and associated hierarchy.

The above-noted first option, option 1, as described in connection with FIG. 9 write processing avoids deadlock and resolves lock contention or conflicts using the permutation denoting a ranking of the systems in the metro cluster. In some systems, it may be undesirable to have the inherent bias at the system level that occurs when using the permutation of option 1. It may also be undesirable in some systems to have the additional processing overhead of periodically determining a new permutation. Additionally, option 1 may not be optimal for some metro cluster configurations including more than, for example, 3 or 4 systems.

As a result, a second option, option 2, described below may be used for write processing as an alternative to option 1 described above. Generally, option 2 described below with reference to the flowcharts of FIGS. 10A and 10B does not utilize the permutation of option 1. Rather, option 2 uses a random lock weight. In at least one embodiment, the random lock weight may be a random 64 bit number determined by the write initiator or originator system receiving and processing the write operation. In the following paragraphs, the random lock weight is 64 bits in size. More generally, a lock weight of any suitable size may be used and the techniques herein are not limited to using one that is 64 bits. With the option 2, each received write I/O operation is assigned an associated weight particular to that write I/O. Thus, option 2 in contrast to option 1 may be characterized as providing a finer granularity of control of prioritization of write processing that may be varied per write I/O. In contrast, option 1 provides for prioritization of write processing at the data storage system level based on the particular priority of the write initiator system in the hierarchy denoted by the permutation.

Figure 10A:
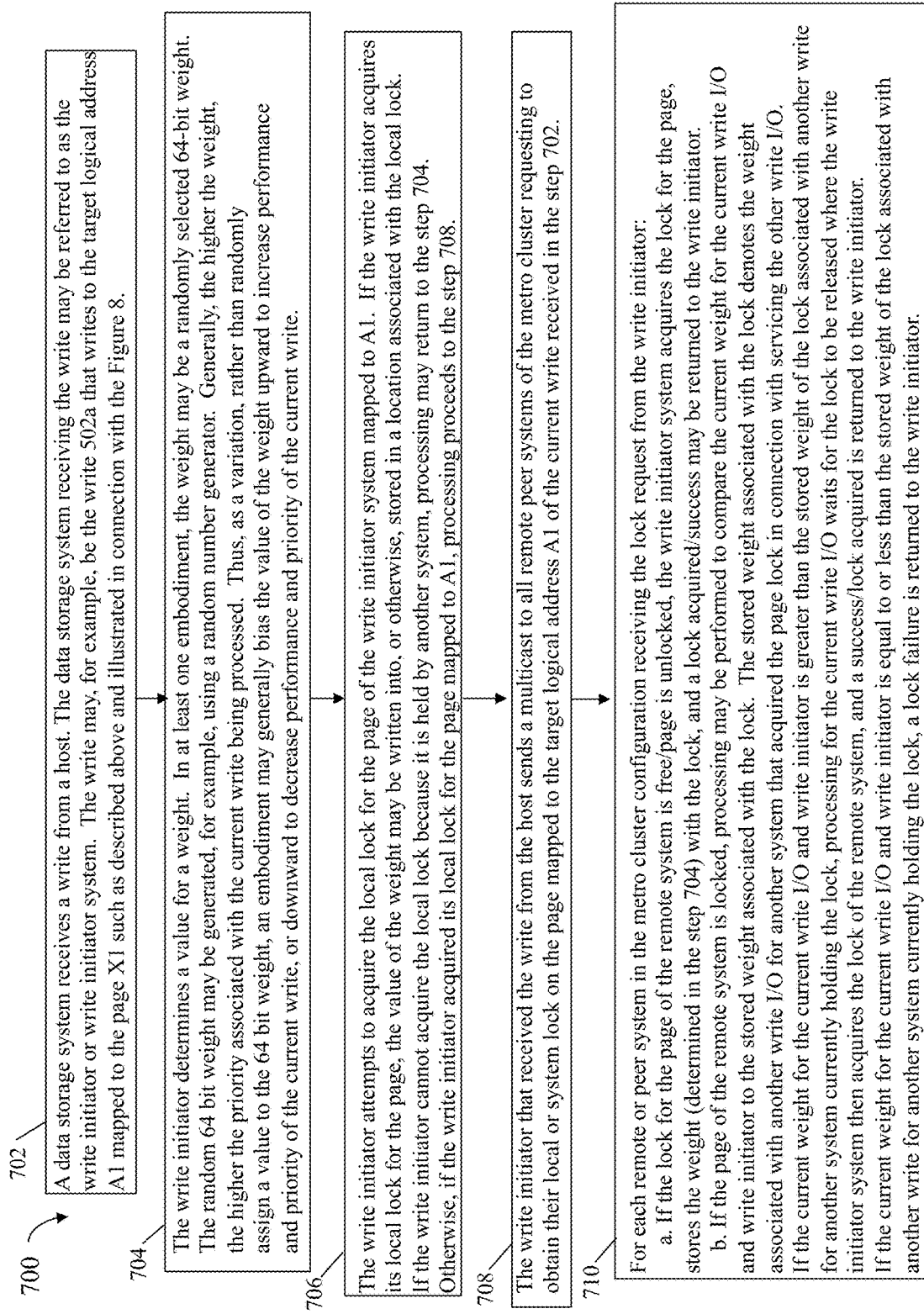
Figure 10B:
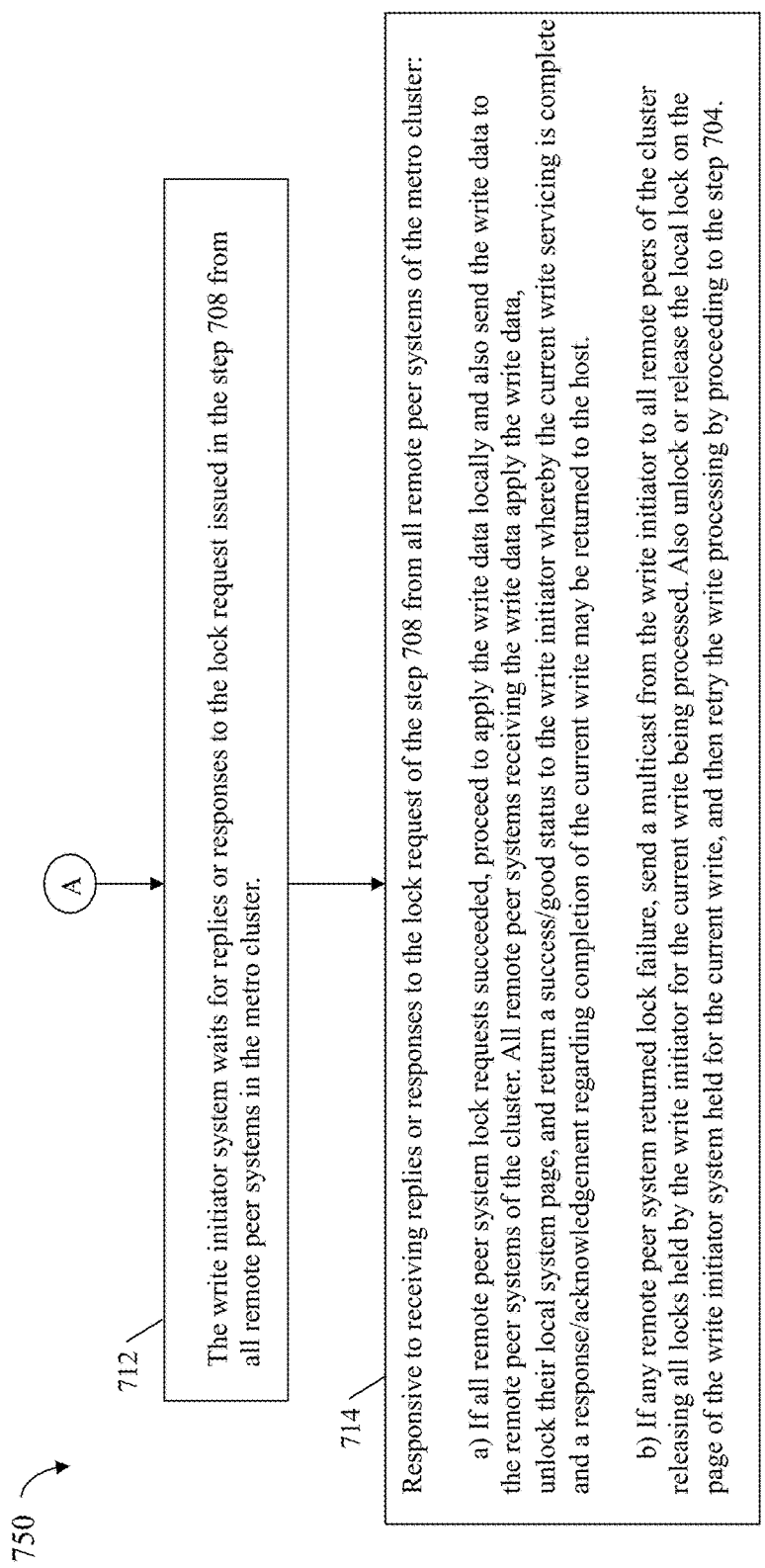

Referring to FIGS. 10A and 10B, shown is a flowchart 700 of processing that may be performed in connection with option 2 for write processing in an embodiment in accordance with the techniques herein.

At the step 702, a data storage system receives a write from a host. The write may be directed to a target logical address of a stretched volume or LUN configured from multiple local volumes or LUNs across systems of the metro cluster. The data storage system receiving the write may be referred to as the write initiator or write initiator system. The write may, for example, be the write 502a that writes to the target logical address A1 mapped to the page X1 such as described above and illustrated in connection with the FIG. 8. From the step 702, control proceeds to the step 704.

At the step 704, the write initiator determines a value for a weight. In at least one embodiment, the weight may be a randomly selected 64-bit weight. The random 64 bit weight may be generated, for example, using a random number generator. Generally, the higher the weight, the higher the priority associated with the current write being processed. Thus, as a variation, rather than randomly assign a value to the 64 bit weight, an embodiment may generally bias the value of the weight upward to increase performance and priority of the current write, or downward to decrease performance and priority of the current write. From the step 704, control proceeds to the step 706.

At the step 706, the write initiator attempts to acquire the local lock for the page of the write initiator system mapped to A1. If the write initiator acquires the local lock for the page, the value of the weight may be written into, or otherwise, stored in a location associated with the local lock. If the write initiator cannot acquire the local lock because it is held by another system, processing may return to the step 704. Otherwise, if the write initiator acquired its local lock for the page mapped to A1, processing proceeds to the step 708.

At the step 708, the write initiator that received the write from the host sends a multicast to all remote peer systems of the metro cluster requesting to obtain their local or system lock on the page mapped to the target logical address A1 of the current write received in the step 702. From the step 708, control proceeds to the step 710.

In the step 710, for each remote or peer system in the metro cluster configuration receiving the lock request from the write initiator:

a. If the lock for the page of the remote system is free/page is unlocked, the write initiator system acquires the lock for the page, stores the weight (determined in the step 704) with the lock, and a lock acquired/success may be returned to the write initiator.

b. If the page of the remote system is locked, processing may be performed to compare the current weight for the current write I/O and write initiator to the stored weight associated with the lock. The stored weight associated with the lock denotes the weight associated with another system that may have acquired the page lock in connection with servicing another write I/O. Further processing may be performed in accordance with the comparison of step 710b). If the current weight for the current write I/O and write initiator is greater than the stored weight of the lock associated with another write I/O of another system currently holding the lock, processing for the current write I/O waits for the lock to be released. Responsive the lock's release, the write originator system acquires the lock of the remote system, and then a success/lock acquired response is returned to the write initiator. If the current weight for the current write I/O and write initiator is equal to or less than the stored weight of the lock associated with another write of another system currently holding the lock, a lock failure is returned to the write initiator. In response to receiving the lock failure as discussed below in connection with the step 714, the write initiator backs off or yields processing of the current write. In particular, in response to receiving the lock failure, the write initiator: sends a multicast to all remote peer systems of the cluster releasing all locks held by the write initiator for the current write I/O; waits a small amount of time such as 1 second or another suitable amount of time; and then retries processing for the current write by proceeding to the step 704.

After performing either 710a) or 710b) of the step 710, control proceeds to the step 712.

At the step 712, the write initiator system waits for replies or responses to the lock request issued in the step 708 from all remote peer systems in the metro cluster. From the step 712, control proceeds to the step 714.

At the step 714, responsive to the write initiator receiving replies or responses to the lock request of the step 708 from all remote peer systems of the metro cluster:

a) If all remote peer system lock requests succeeded, the write initiator system proceeds to apply the write data locally and also send the write data to remote peer systems of the cluster. All remote peer systems receiving the write data apply the write data, unlock their local system page, and return a success/good status to the write initiator whereby the current write servicing is complete and a response/acknowledgement regarding completion of the current write may be returned to the host.

b) If any remote peer system returned lock failure, the write initiator sends a multicast from the write initiator to all remote peers of the cluster releasing all locks held by the write initiator for the current write being processed. Also processing is performed to unlock or release the local lock on the page of the write initiator system held for the current write, and then retry the current write processing by proceeding to the step 704. At some subsequent point in time, the current write processing succeeds and completes, whereby the step 714a is performed.

The processing of the FIGS. 10A and 10B for option 2 guarantees no dead lock since a dead lock between multiple writes means that each of the writes is waiting for some lock to be released. However, the write with the lowest relative weight of all the multiple writes will never wait for any needed locks in connection with the step 710b) of FIGS. 10A and 10B.

As noted above in connection with the step 704, rather than randomly assign a value to the 64 bit weight, an embodiment may generally bias the value of the weight upward to increase performance and priority of the current write, or downward to decrease performance and priority of the current write. Thus in at least one embodiment, the weight assigned to each received write in the step 704 may be selected in accordance with any suitable criteria. For example, the weight assigned in the step 704 to a received write may be varied in accordance with one or more factors such as the target volume to which the write is directed, the particular write originator system that received the write and which is currently servicing the write, and/or other suitable factors. To further illustrate, for example, one or more particular stretched volumes or LUNs may be used to store data of a performance critical application. In this case, the write I/Os directed to this particular stretched volume may be assigned relatively higher weights than other write I/Os directed to other LUNs or volumes that may have a lower performance target, goal or level of importance than the particular stretched volume.

The above-noted option 1 (e.g., discussed in connection with FIG. 9) and option 2 (e.g., discussed in connection with FIGS. 10A-B) generally perform two phases, round trips or iterations across systems of the metro cluster when servicing a write operation. For example, consistent with other discussion herein the first phase or round trip of processing attempts to acquire all the needed locks for a write across all systems of the metro cluster; and the second phase or round trip sends the write data to all the systems in the metro cluster where the systems then apply the write data to the target logical address of the write operation. In at least one embodiment, the target logical address may be a logical address on a stretched volume or LUN configured from N volumes or LUNs, respectively, on the N systems of the metro cluster. To the host sending the write, all the N volumes or LUNs are configured to have the same identity when presented or exposed to the host. Thus, the host perceived the multiple paths to the N volumes or LUNs as multiple paths to the same stretched volume or LUN.

As a variation to the two phase write processing of option 1 (e.g., FIG. 9) and option 2 (e.g., FIGS. 10A-B), the foregoing write processing may be varied and readily adapted for use in a single phase or round trip among the systems of the metro cluster. Depending on the application, the result of a potentially incomplete write using a single phase may or may not be acceptable. In connection with option 1 and option 2 processing discussed herein, such processing may be modified to implement a single phase or round trip using a compound operation to both acquire a lock and also apply the write data with the same command. For example, the compound operation may be requested using a remote replication command issued to each of the remote or peer systems. If the locks on the desired pages are all successfully acquired and the write data is also successful applied on all remote systems using such a compound operation with each single command in a single phase, processing of the write is then completed in one phase or round trip. Otherwise, if any of the commands requesting performance of the compound operation on a remote system fails to successfully complete, processing of the write by the initiating system (e.g., that received the write and is performing the associated write processing) retries the failed one or more commands. In some cases, one or more of the compound operations requested in the single phase may have completed successfully, and one or more of the compound operations requested in the single phase may have failed. As a result, the write may be applied to the target logical address on one or more systems of the metro cluster, and the write may otherwise not have been applied to the target logical address on one or more other systems of the metro cluster. Since the write has not been acknowledged to the host that sent the write, the foregoing inconsistency in content or data stored at the target logical address of the write on different LUNs or volumes of the different systems of the metro cluster is allowable in accordance with the SCSI standard. However, if the host sends a read command, for example, to read the content stored at the target logical address, the content returned may vary depending on the systems of the metro cluster that receives and processes the read. In accordance with the SCSI or other standard, the foregoing may be allowable since the write processing has not yet completed and the write has not yet been acknowledged to the sending host whereby the host can make no expectations regarding the content stored at the target logical address. In at least one embodiment, the foregoing potential data inconsistency may be acceptable to a client or user, such as an application executing on the host, where the single phase implementation or variation may be utilized resulting in improved write response time by combining implementation of the two phases (e.g., the lock & write apply phases) into a single phase using a single command that requests the compound operations of lock and apply. However, if a the foregoing potential data inconsistency using the single phase is unacceptable to a client or user, the two phase or round trip implementation of option 1 or option 2 discussed above, for example, in connection with FIGS. 9, 10A and 10B may alternatively be used.

What will now be described is a third option, option 3, for write processing of a write received at a data storage system of the metro cluster configuration. In option 3 described below, a concept of address ownership or chunk ownership may be utilized. With the third option, the entire address space corresponding to volume or LUN address space across all volumes or LUNs in the metro cluster may be partitioned into slices, where the slices may be further partitioned into smaller units or chunks. The following paragraphs make reference to particular sizes, for example, for the address space, chunk size and slice size. However more generally the option 3 may be used in connection with any suitable values for the foregoing sizes.

For example, consider a 64 bit address space where the bits range from 0 (the least significant bit or LSB) to 63 (the most significant bit or MSB). In at least one embodiment, the 64 bit address space may be partitioned into 1 MB chunks where all addresses with the same bit values for the bit positions 20-63 are in the same chunk. Additionally, slices may be specified which include multiple chunks. In at least one embodiment, slices may be defined using the bit values of addresses at the bit positions 20-29. The binary values of the bits 20-29 of each address are in the inclusive range 0-1023 and define a slice number. In this manner, the 64 bit address space may be partitioned into 1024 slices of 1 MB chunks. In such an embodiment, the 64 bit address space may represent an aggregation of the logical address spaces or ranges of all volumes or LUNs in the system. Each 1 MB chunk of the 64 bit address space may correspond to, or map to, a particular volume or LUN of the metro cluster.

Initially, all the slices of the 64 bit address space may be distributed as evenly as possible among the data storage systems of the metro cluster. For example, with a metro cluster of 4 systems, each of the 4 systems may be assigned 256 slices (e.g., total of 1024 slices). Each of the 4 systems may initially own all chunks included in its assigned 256 slices. For each of the systems of the metro cluster, a sparse bitmap or other suitable structure may be used to represent chunk ownership for the system. In at least one embodiment, the bitmap representing chunk ownership for a system may include a corresponding bit for each chunk in the 64 bit address space, where the bit has a value of 1 if the corresponding chunk is owned by the system associated with the bit map, and where the bit otherwise has a value of 0 if the corresponding chunk is not owned by the system associated with the bit map.

For example, with reference to FIG. 8, a first bitmap of the system 410 may denote the particular chunks owned by the system 410, where a corresponding bit for a chunk has a value of 1 if the chunk is owned by the system 410 and where the corresponding bit for the chunk otherwise has a value of 0 if the chunk is not owned by the system 410. By default, every system of the metro cluster may own all chunks that are in its initially assigned slices. The bitmap representing chunk ownership for a system may further be modified over time to describe changes or transitions in chunk ownership for the system. If the system gains ownership over a chunk previously owned by another system of the cluster, the corresponding bit position for the chunk in the system's bitmap changes from 0 to 1. If the system loses or transfers ownership of a chunk to another system, the corresponding bit position for the chunk in the system's bitmap changes from 1 to 0. Thus a system's associated bitmap at a particular point in time may be used to denote which chunks are currently owned by the system at the particular point in time.

In at least one embodiment using option 3, the page size may be 1 MB or the size of a single chunk. In this manner, taking a page block means taking a lock on a single chunk.

Figure 11A:
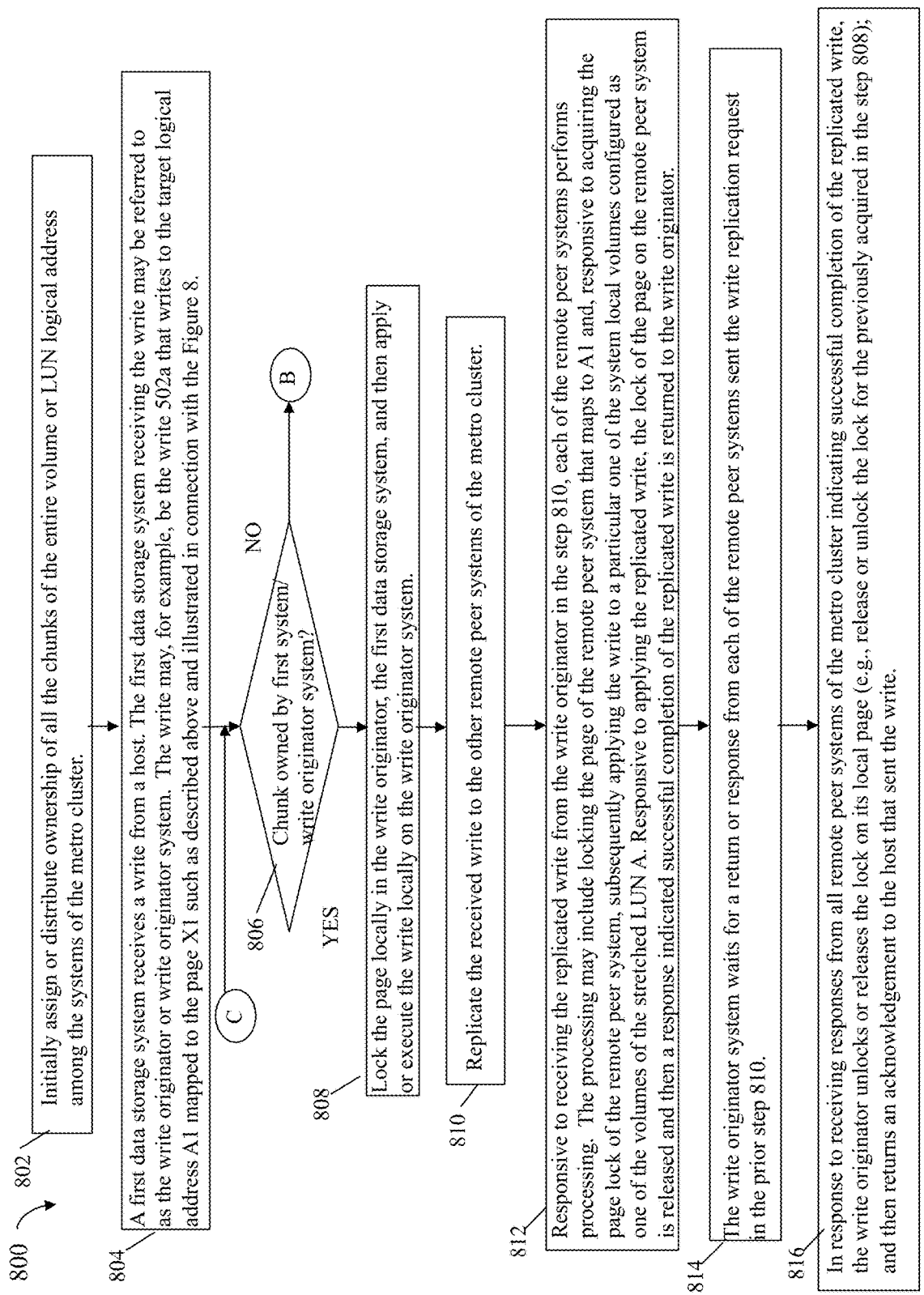

Generally with option 3, a system receiving a write to a target address that falls within a particular chunk first acquires ownership of the particular chunk before proceeding further with write processing for the received write. In this manner, chunk ownership may be used as a mechanism to avoid deadlock. Write processing that may be performed in connection with an embodiment implementation option 3 is described below with reference to FIGS. 11A and 11B and the flowchart 800.

At the step 802, processing may be performed to initially assign ownership of all chunks of the total volume or LUN logical address space among the systems of the metro cluster. The initial assignment of ownership may generally distribute ownership of the chunks of the total volume or LUN logical address space among the systems of the metro cluster. An example of how ownership of chunks may be initially distributed among the systems of the metro cluster is described above. In the step 802, a bitmap or other structure associated with each system of the metro cluster may be initialized to reflect the current chunk ownership of the associated system. As chunk ownership is transferred over time, the bitmaps of the affected systems may be accordingly updated to accurately reflect any changes to chunk ownership. From the step 802, control proceeds to the step 804.

At the step 804, a write from a host may be received at a first data storage system of the metro cluster. The write may be directed to a target logical address of a stretched volume or LUN configured from multiple local volumes or LUNs across systems of the metro cluster. The data storage system receiving the write may be referred to as the write originator or write originator system. For example with reference back to FIG. 8, the write 502a may be sent from the host 502 to the system 410, where the write 502a writes to the target logical address A1 on the stretched volume or LUN A, and where the target logical address maps to the page X1. From the step 804, control proceeds to the step 806.

At the step 806, a determination is made as to whether the target logical address A1 of the volume or LUN A maps to a chunk owned by the first system. If the step 806 evaluates to yes, control proceeds to the step 808.

At the step 808, processing may be performed to lock the page locally in the write originator, the first data storage system; and then apply or execute the write locally on the write originator system. If the page of the write originator is already locked, processing waits for the lock on the page to be released, acquires the lock, and then applies or executes the write locally on the write originator system (e.g., write the data to the target logical address A1 of the particular volume 425*a* configured as one of the volumes of the stretched LUN A). From the step 808, control proceeds to the step 810.

At the step 810, processing is performed to replicate the received write from the write originator to the other remote peer systems of the metro cluster. From the step 810, control proceeds to the step 812 where processing is performed by each of the remote peer systems in response to receiving the replicated write sent from the write originator system in the step 810.

At the step 812, responsive to receiving the replicated write from the write originator in the step 810, each of the remote peer systems performs processing. The processing of the step 812 performed in response to receiving the replicated write may include locking the page of the remote peer system that maps to A1 and, responsive to acquiring the page lock, subsequently applying the write to a particular one of the system local volumes configured as one of the volumes of the stretched LUN A. If the page of the remote peer system is already locked, processing of the current replicated write waits for the lock of the page of the remote peer system to be released. In response to releasing the lock of the page of the remote peer system, processing of the step 812 acquires the lock. Responsive to acquiring the lock of the page on the remote peer system, the replicated write is applied to a particular one of the remote system volumes configured as one of the volumes of the stretched LUN A. Responsive to applying the replicated write, the lock of the page on the remote peer system is released and then a response indicated successful completion of the replicated write is returned to the write originator. From the step 812, control proceeds to the step 814.

At the step 814, the write originator system waits for a return or response from each of the remote peer systems sent the write replication request in the step 810. From the step 814, control proceeds to the step 816.

At the step 816, in response to receiving responses from all remote peer systems of the metro cluster indicating successful completion of the replicated write, the write originator unlocks or releases the lock on its local page (e.g., release or unlock the lock for the previously acquired in the step 808); and then returns an acknowledgement to the host that sent the write. The acknowledgement may indicate successful completion of the write operation received from the host in the step 804.

Figure 11B:
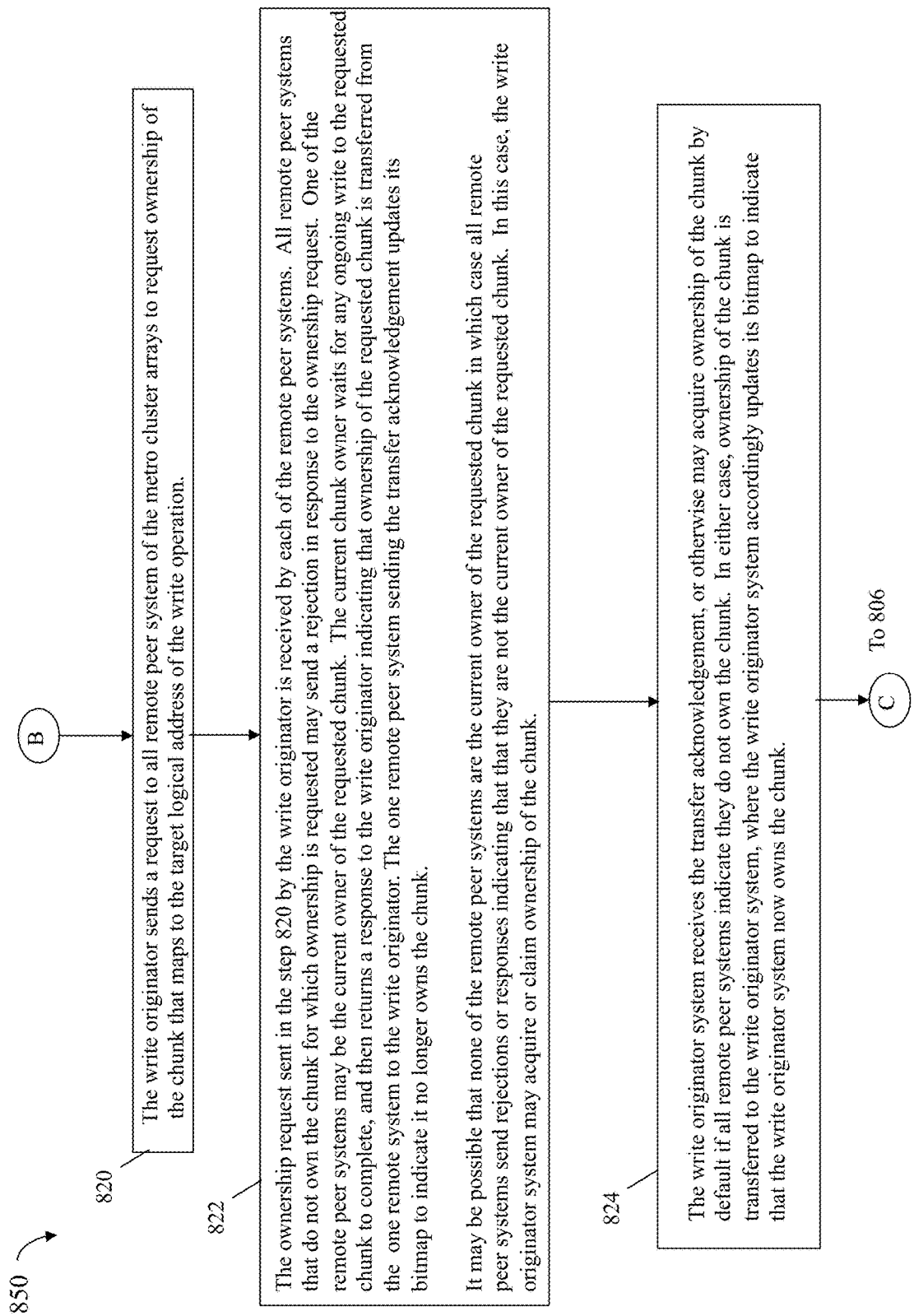

If the step 806 evaluates to no, control proceeds to the step 820 of FIG. 11B, where processing is performed in connection with the chunk including the target logical address A1, and where the chunk is owned by another system other than the write originator system. In the step 820, the write originator sends a request to all remote peer systems of the metro cluster arrays to request ownership of the chunk that maps to the target logical address of the write operation. From the step 820, control proceeds to the step 822.

At the step 822, the ownership request sent in the step 820 is received by each of the remote peer systems. All remote peer systems that do not own the chunk for which ownership is requested may return a rejection in response the ownership request. One of the remote peer systems may be the current owner of the requested chunk. The current chunk owner waits for any ongoing write to the requested chunk to complete and then returns a response to the write originator indicating that ownership of the requested chunk is transferred from the one remote system to the write originator. The current chunk owner, the one remote peer system sending the transfer acknowledgement, updates its bitmap to indicate it no longer owns the chunk.

In connection with the step 822, it may be possible that none of the remote peer systems are the current owner of the requested chunk in which case all remote peer systems send rejections or responses indicating that that they are not the current owner of the requested chunk. In this case, the write originator system may acquire or claim ownership of the chunk. From the step 822, control proceeds to the step 824.

At the step 824, the write originator system receives the transfer acknowledgement, or otherwise may acquire ownership of the chunk by default if all remote peer systems indicate they do not own the chunk. In either case, ownership of the chunk is transferred to the write originator system, where the write originator system accordingly updates its bitmap to indicate that the write originator system now owns the chunk. From the step 824, control proceeds to the step 806 to process the write operation.

In at least one embodiment in connection with the step 822, it may be the case that a particular chunk is not owned by any of the responding systems of the metro cluster. For example, in at least one embodiment, a system may have been previously evicted from the cluster where the chunks owned by the evicted system do not have an owner. In this case, the write originator requesting ownership of the chunk may simply take the chunk and become the chunk's owner if ownership of the chunk is not claimed by any remote peer system of the metro cluster. Thus the foregoing may be a mechanism used for recovering lost ownership of a chunk.

In at least one embodiment of option 3 where the page size and the chunk size are the same, such as 1 MB, each page or chunk may have a state that is one of the following: not owned by any system of the metro cluster; owned and unlocked; or owned and locked. In order to execute a write, a write originator system receiving the write first needs to acquire ownership of the page that maps to or includes the target logical address of the write. An embodiment of option 3 may use a smaller page size and smaller chunk size, such as 4 KB, providing for a finer granularity. In such implementations, the smaller the page size and chunk size, the more metadata and overhead utilized.

With locality of reference, hosts may tend to write to the same logical addresses where such writes may be sent to the same data storage system of the metro cluster. Such locality of reference may be expected to create an affinity of particular logical addresses for a particular data storage system of the metro cluster and increase chances that subsequent writes to the same particular data storage system are directed to one of the particular logical addresses, or another logical address that is logically near the particular logical addresses. With such locality of reference, it may be expected that the subsequent writes are directed to logical addresses of chunks owned by the particular data storage system thereby reducing write latency and increasing write performance. Thus, over time with locality of reference, it may be expected that ownership of particular chunks transitions to one of the data storage systems that receives writes directed to target logical addresses mapped to the particular chunks.

In at least one embodiment, a received write from a host may span across chunk boundaries by writing to target logical addresses in multiple chunks. In this case, the single host write may be partitioned into multiple writes by the write originator, where each of the multiple chunks does not cross chunk boundaries. For example, if a host write is directed to multiple target logical addresses in two chunks, the host write may be automatically partitioned into two writes by the receiving system where each of the two writes is wholly within a single chunk (e.g., does not span across chunk boundaries). A first of the two writes may write to a first chunk and a second of the two writes may write to a different second chunk.

In at least one embodiment in accordance with the techniques herein, metro cluster membership may be managed using standard cluster algorithms, such as Paxos. With these algorithms, a metro cluster of data storage system can make a decision to evict a member. After a member is evicted, there's no need to replicate to that member anymore. Eviction of a member system can be triggered, for example, if the member system is non responsive, if another cluster member cannot replicate data to the member system, or if a user decides to remove the member system from the cluster. In connection with a system evicted from the metro cluster, the techniques described herein in connection with option 3 may be used to recover lost chunk ownership of chunks owned by an evicted system. For example, chunks owned by an evicted system may transition to unowned after the system is evicted. Subsequently, ownership of the chunks and locks associated with the chunks may be recovered using option 3 above such as when a request for ownership of a chunk results in rejections or responses indicating that no system of the cluster owns the chunk.

In at least one embodiment, a data storage system may be added (or re-added) as a member of the metro cluster. In at least one embodiment utilizing option 3 with chunk ownership, when a system is added as a member to the metro cluster, the system may start with no ownership of any chunks. Subsequently, the system may acquire ownership of chunks as the system receives writes and performs processing of the writes as described herein in connection with option 3 (e.g., FIGS. 11A and 11B).

In at least one embodiment, a system added as a member of the metro cluster may update a local volume included in a configuration of a stretched volume by pulling data from the one or more other volumes included in the stretched volume configuration where such other volumes are included in other systems of the metro cluster. For example, reference is made to FIG. 8 where, for example, the system 410 may be added to the current metro cluster that includes the systems 430 and 490. In this case, the volume 425a of the system 410 may be updated and synchronized to include the data of the stretched volume or LUN by copying data from either the volume 425b and/or 425c. To facilitate incremental resynchronization, data storage system may take period snapshots. For example, with 10 data storage systems in the metro cluster and a stretched volume configured from 10 local volumes on the 10 systems, the 10 system may take an hourly snapshot of the 10 local volumes at random offsets from a whole hour. In this case, the metro cluster has on average may take a snapshot every 6 minutes on one of the 10 systems for the stretched volume. If the system X is one of the 10 systems evicted from the cluster and then X is added back into the cluster, X needs to perform an incremental resynchronization of its local volume V used in the configuration of the stretched volume. In at least one embodiment, the system X may perform an incremental resynchronization of its local volume V using the following algorithm:

1. Examine the time T when the system X was last part of the cluster. If this time is unknown or the system X has never been part of the cluster, perform a full resynchronization of V.

2. Send a query to all cluster system members asking them for their latest snapshot of the stretched volume before T.

3. Select the cluster system member with the most recent snapshot S before T, and ask the system to update V on the system X by providing to the system X all writes between S and the current time, using asynchronous replication.

4. At some point, when the asynchronous replication performed to update V has completed, or is almost completed, start sending synchronous writes for the stretched volume to the system X.

5. Once the local volume V of the system X is synchronized with other local volumes $V_1$ through $V_{N-1}$ of other cluster system members included in the stretched volume configuration, the system X joins the cluster and starts receiving writes, for example, such as writes directed to the stretched volume. (e.g., In at least one embodiment, N may denote the number of systems in the cluster and also the number of local system LUNs or volumes configured as a stretched volume or LUN).

In connection with a metro cluster configuration including two or more current systems, adding a new cluster member using the above-noted incremental resynchronization algorithm may include selecting one or more of the current multiple systems as data sources from which to pull or copy the necessary data.

In a metro cluster with only two systems, when communication between the two systems fails so that writes cannot be replicated between the systems, polarization may be triggered in order to reduce the two active/active systems to a single system that keeps servicing data requests. In a metro configuration with only two systems, polarization includes a technique for selecting a single survivor system to handle or service I/Os. In metro cluster configurations with more than two systems, the following processing may be performed as part of polarization processing:

1. It may be determined that a write cannot be replicated to a system X of the metro cluster, or that the system X is non-responsive to communications sent, for example, by other cluster members.

2. One of the systems, Y, of the metro cluster decides to evict X based on the communication failure ore replication failure of X noted above in 1. Y may start a cluster decision process for evicting X.

3. At the end of the eviction process, there are two possible outcomes:

a. X is evicted. Additionally, also evicted is every other system of the metro cluster that did not respond or accept the cluster decision on eviction. The new cluster agrees on membership. Received write I/Os can complete now, replicating to all surviving members.

b. X is not evicted. This can happen, for example, if the problem was with the system Y initiating the request. (For example, the system Y lost communication with other external systems that do not belong to the metro cluster but existing cluster members can communicate with the system Y). In this case, the system Y may itself be evicted from the metro cluster.

4. All systems evicted from the metro cluster stop responding to host I/Os. In at least one embodiment supporting the SCSI and ALUA protocols, evicted systems may set their path states for all volumes or LUNs exposed over target ports of the evicted system to the ALUA path state of unavailable.

5. If the system X is evicted, the system X may request to rejoin the metro cluster at a later point in time when it re-establishes communication with other members of the cluster.

Thus performing a cluster eviction from the metro cluster may result in evicting one or more systems from the metro cluster.

In at least one embodiment with a metro cluster of 3 or more systems, a majority rule may be used to evict an existing system of the metro cluster that is unable to communicate with other cluster members. Quorum or the majority vote on whether to evict an existing cluster member may be determined based on the particular systems of the cluster that can communicate with one another. For example, assume we have a metro cluster of 4 systems and one system X1 cannot communicate with any of the other remaining 3 systems of the cluster. In this case, the remaining 3 systems in communication with one another may pass a decision to evict the system X1 from the metro cluster. In at least one embodiment where all systems of the cluster have an equal weight in the cluster decision rendered, passing a decision may require greater than N/2 votes where N=4, the number of cluster members. Thus with a 4 member cluster, more than 2 systems are required to vote to evict X1 in order to have quorum and remote X1 from the metro cluster.

As a variation, an embodiment in accordance with the techniques herein may not assign the same voting weight to each member of the metro cluster in order to avoid some undesirable scenarios in connection with a metro cluster having an even number of system members. For example, consider a metro cluster with N=4 systems. A 2/2 split may occurs where a first set of the systems 1 and 2 of the cluster can communicate with each other but no other system in the cluster, and a second set of the systems 3 and 4 can communicate with each other but no other system in the cluster. In this example scenario with the 2/2 split, no quorum can be achieved with greater than 50% of the cluster whereby no eviction resolution is passed and all cluster members may go offline. In order to avoid the foregoing failure of the entire metro cluster since no majority vote can be achieved, an embodiment may modify the weights assigned to the different systems of the 4 member metro cluster. Rather than all 4 members having the exact same voting weight, an embodiment may make small modifications to the voting weights of the 4 systems. For example, with a metro cluster of 4 systems, instead of a 25% vote for each of the 4 systems, the 4 systems may be assigned the following adjusted percentage weights: 23%, 24%, 25%, and 28%. With the 2/2 split scenario as discussed above but using the adjusted percentage weights, no 2/2 split of the 4 systems results in an exact 50%-50% split as before. With the adjusted unequal weights assigned to the 4 system, one of the sets of 2 systems in communication with each other will have >50% vote and be able to evict the other set of the remaining two systems in communication. In a similar manner, unequal weights may be assigned to systems of a metro cluster having an even number of member systems.

In at least one embodiment, the following processing may be performed to assign voting weights to systems that are members of the metro cluster:

1. With a cluster of N systems, set for each a weight of 1/N.

2. Modify N-1 of the N weights by a small amount such as, for example an amount that is less than (1/(N*2)).

3. Further modify the last weight so that the sum of all the N weights of the N systems is 1.

4. After evicting one or more systems of the cluster, rebalance the weights of the members so that new total is again 1.

5. If adding a system to the cluster, determine the varied unequal weights for members of the cluster as described above, where the cluster now includes the newly added system.

In scenarios where the number of systems in the metro cluster decrease to two members, one of the two member system may be given preference and assigned a voting percentage of more than 50%. In this case, if the polarization algorithm is triggered such as due to a communication failure between the two members, polarization processing may select the single member system with the voting percentage of more than 50% as the designated sole survivor of the cluster to service requests data requests.

In connection with the various embodiments described herein with a metro cluster configuration, reads directed to a stretched volume or LUN configured from local volumes of systems of the cluster may be received by one system of cluster and accordingly serviced locally by the receiving system without requiring communication with other systems of the cluster.

In connection with the three options (e.g., option 1, option 2, and option 3) described above for write processing, any penalty incurred due to a lock collision or conflict may vary with the particular option. The data transfer time to replicate a write from a first system receiving the write to the remaining remote peer systems may be bounded by the maximum of all transfer or replication times to all remote peer systems.

Generally, the techniques described herein, such as the processing of the three options—option 1, option 2 and option 3, may be used in connection with a metro cluster configuration of N=2 or more data storage systems or appliances.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer-implemented method comprising:
configuring a stretched volume from N volumes of N data storage systems configured as a cluster, wherein N is an integer value that is greater than two, wherein each of the N volumes is included in a different one of the N data storage systems, wherein the N volumes are exposed to a host as a same logical volume having a same first unique identifier over a plurality of paths from the N data storage systems, wherein the N volumes are configured for multidirectional synchronous replication whereby a write directed to the stretched volume received at any one of the N data storage systems is synchronously replicated to every other one of the N data storage systems of the cluster;

receiving, at a first of the N data storage systems, a first write that writes first data to a target logical address of the stretched volume; and in response to receiving the first write at the first data storage system, servicing the first write, wherein said servicing the first write includes synchronously replicating the first write received at the first data storage system to every other one of the N data storage systems of the cluster, and wherein servicing the first write further includes:

acquiring, by the first data storage system, N locks providing the first data storage system with exclusive access to the target logical address of the stretched volume across the cluster, wherein each of the N locks is acquired from a corresponding one of the N data storage systems of the cluster;

applying the first write to the first target logical address of the stretched volume, wherein applying the first write includes storing the first data at physical storage locations on the N volumes of the N data storage systems configured as a cluster, wherein the physical storage locations are mapped to the target logical address of the stretched volume; and releasing the N locks.

2. The computer-implemented method of claim 1, wherein the first write is synchronously replicated directly from the first data storage system to a second data storage system of the N data storage systems over a first link between the first data storage system and the second data storage system.

3. The computer-implemented method of claim 2, wherein the first write is synchronously replicated indirectly from the first data storage system to a third data storage system of the N data storage systems, and wherein the method includes:

synchronously replicating the first write from the second data storage system to the third data storage system over a second link between the second data storage system and the third data storage system.

4. The computer-implemented method of claim 1, wherein servicing the first write further includes:

determining, by the first data storage system, that a first of the N locks is currently held by a second data storage system of the cluster in connection with servicing a second write operation directed to the stretched volume.

5. The computer-implemented method of claim 4, wherein a hierarchy of the N data storage systems of cluster denotes a ranking of the N data storage systems, and wherein servicing the first write further includes:

determining whether the first data storage system is ranked higher than the second data storage system in said ranking; and responsive to determining that the first data storage system ranks higher than the second data storage system in said ranking, performing first processing comprising:

waiting for the first lock to be released by the second data storage system; and acquiring, by the first data storage system, the first lock.

6. The computer-implemented method of claim 5, wherein servicing the first write further includes:

responsive to determining that the first data storage system does not rank higher than the second data storage system in said ranking, performing second processing comprising:

releasing any of the N locks held by the first data storage system in connection with said servicing the first write.

7. The computer-implemented method of claim 5, further comprising:

periodically determining a new ranking of the N data storage systems of the cluster, wherein the new ranking replaces of a current ranking of the N data storage systems of the cluster and wherein the new ranking is used in place the current ranking when servicing writes directed to a plurality of stretched volumes configured across the N data storage systems of the cluster, wherein the plurality of stretched volumes includes the stretched volume.

8. The computer-implemented method of claim 5, wherein the ranking is randomly determined.

9. The computer-implemented of claim 4, wherein a first weight is associated with the first write being serviced by the first data storage system, and wherein a second weight is associated with the second data storage system currently holding the first lock, and wherein servicing the first write further includes:

determining whether the first weight is greater than the second weight; and responsive to determining that the first weight is greater than the second weight, performing first processing comprising:

waiting for the first lock to be released by the second data storage system; and acquiring, by the first data storage system, the first lock.

10. The computer-implemented method of claim 9, wherein servicing the first write further includes:

responsive to determining that the first weight is not greater than the second weight, performing second processing comprising:

releasing any of the N locks held by the first data storage system in connection with said servicing the first write.

11. The computer-implemented method of claim 1, wherein a logical address range of the stretched volume is partitioned into a plurality of chunks, wherein each of the plurality of chunks is owned by a single one of the N data storage systems of the cluster, and wherein the target logical address of the first write is included in a first of the plurality of chunks owned by a particular one of the N data storage systems of the cluster.

12. The computer-implemented method of claim 11, wherein servicing the first write further includes:

determining whether the first data storage system owns the first chunk; and responsive to determining that the first data storage system owns the first chunk, performing first processing, wherein said first processing comprises:

said acquiring the N locks;

said applying the first write to the first target logical address of the stretched volume; and said releasing the N locks.

13. The computer-implemented method of claim 12, wherein servicing the first write further includes:

responsive to determining that the first data storage system does not own the first chunk, performing second processing comprising:

sending a request to each of the other N data storage systems of the cluster requesting ownership of the first chunk;

receiving, from one of the N data storage systems that is a current owner of the first chunk, a response indicating that ownership of the first chunk is transferred from the one data storage system to the first data storage system; and performing said acquiring the N locks.

14. The computer-implemented method of claim 13, wherein said second processing further comprises:

said applying the first write to the first target logical address of the stretched volume; and said releasing the N locks.

15. The computer-implemented method of claim 14, wherein the first data storage system is associated with a first bitmap indicating which of the plurality of chunks are owned by the first data storage system, and wherein the one data storage system is associated with a second bitmap indicating which of the plurality of chunks are owned by the one data storage system.

16. The computer-implemented method of claim 15, wherein prior to transferring ownership of the first chunk to the first data storage system, the second bitmap indicates that the first chunk is owned by the one data storage system and the first bitmap indicates that the first chunk is not owned by the first data storage system.

17. The computer-implemented method of claim 16, wherein after transferring ownership of the first chunk from the one data storage system to the first data storage system, the second bitmap is updated to indicate that the first chunk is not owned by the one data storage system and the first bitmap is updated to indicate that the first chunk is owned by the first data storage system.

18. A system comprising:

one or more processors; and one or more memories comprising code stored thereon that, when executed, performs a method comprising:

configuring a stretched volume from N volumes of N data storage systems configured as a cluster, wherein N is an integer value that is greater than two, wherein each of the N volumes is included in a different one of the N data storage systems, wherein the N volumes are exposed to a host as a same logical volume having a same first unique identifier over a plurality of paths from the N data storage systems, wherein the N volumes are configured for multidirectional synchronous replication whereby a write directed to the stretched volume received at any one of the N data storage systems is synchronously replicated to every other one of the N data storage systems of the cluster;

receiving, at a first of the N data storage systems, a first write that writes first data to a target logical address of the stretched volume; and in response to receiving the first write at the first data storage system, servicing the first write, wherein said servicing the first write includes synchronously replicating the first write received at the first data storage system to every other one of the N data storage systems of the cluster, and wherein servicing the first write further includes:

acquiring, by the first data storage system, N locks providing the first data storage system with exclusive access to the target logical address of the stretched volume across the cluster, wherein each of the N locks is acquired from a corresponding one of the N data storage systems of the cluster;

applying the first write to the first target logical address of the stretched volume, wherein applying the first write includes storing the first data at physical storage locations on the N volumes of the N data storage systems configured as a cluster, wherein the physical storage locations are mapped to the target logical address of the stretched volume; and releasing the N locks.

19. A non-transitory computer readable medium comprising code stored thereon that, when executed, performs a method comprising:

configuring a stretched volume from N volumes of N data storage systems configured as a cluster, wherein N is an integer value that is greater than two, wherein each of the N volumes is included in a different one of the N data storage systems, wherein the N volumes are exposed to a host as a same logical volume having a same first unique identifier over a plurality of paths from the N data storage systems, wherein the N volumes are configured for multidirectional synchronous replication whereby a write directed to the stretched volume received at any one of the N data storage systems is synchronously replicated to every other one of the N data storage systems of the cluster;

receiving, at a first of the N data storage systems, a first write that writes first data to a target logical address of the stretched volume; and in response to receiving the first write at the first data storage system, servicing the first write, wherein said servicing the first write includes synchronously replicating the first write received at the first data storage system to every other one of the N data storage systems of the cluster, and wherein servicing the first write further includes:

acquiring, by the first data storage system, N locks providing the first data storage system with exclusive access to the target logical address of the stretched volume across the cluster, wherein each of the N locks is acquired from a corresponding one of the N data storage systems of the cluster;

applying the first write to the first target logical address of the stretched volume, wherein applying the first write includes storing the first data at physical storage locations on the N volumes of the N data storage systems configured as a cluster, wherein the physical storage locations are mapped to the target logical address of the stretched volume; and releasing the N locks.

* * * * *